(12) United States Patent (10) Patent No.: US 12,563,532 B2
Reial et al. (45) Date of Patent: Feb. 24, 2026

(54) METHODS AND APPARATUS FOR SEARCH SPACE SWITCHING

(71) Applicant: Telefonaktiebolaget LM Ericsson (publ), Stockholm (SE)

(72) Inventors: Andres Reial, Höllviken (SE); Pramod Jacob Mathecken, Lomma (SE); Ali Nader, Malmö (SE); Sina Maleki, Malmö (SE); Ajit Nimbalker, Fremont, CA (US)

(73) Assignee: TELEFONAKTIEBOALGET LM ERICSSON (PUBL), Stockholm (SE)

( * ) Notice: Subject to any disclaimer, the term of this patent is extended or adjusted under 35 U.S.C. 154(b) by 634 days.

(21) Appl. No.: 17/799,434

(22) PCT Filed: Feb. 12, 2021

(86) PCT No.: PCT/EP2021/053545
§ 371 (c)(1),
(2) Date: Aug. 12, 2022

(87) PCT Pub. No.: WO2021/160855
PCT Pub. Date: Aug. 19, 2021

(65) Prior Publication Data
US 2023/0156572 A1 May 18, 2023

Related U.S. Application Data

(60) Provisional application No. 62/976,511, filed on Feb. 14, 2020.

(51) Int. Cl.
H04W 72/04 (2023.01)
H04W 24/02 (2009.01)
H04W 72/23 (2023.01)

(52) U.S. Cl.
CPC ........... H04W 72/04 (2013.01); H04W 24/02 (2013.01); H04W 72/23 (2023.01)

(58) Field of Classification Search
CPC ......... H04W 72/04; H04W 72/23–232; H04W 24/02
See application file for complete search history.

(56) References Cited

U.S. PATENT DOCUMENTS 9,059,822 B2 * 6/2015 Frenne .................. H04L 1/0031
2019/0141546 A1 * 5/2019 Zhou ....................... H04L 5/001
(Continued)

FOREIGN PATENT DOCUMENTS

WO WO 2020/033660 A1 2/2020

OTHER PUBLICATIONS

International Search Report and Written Opinion of the International Searching Authority, PCT/EP2021/053545, mailed Jun. 1, 2021, 21 pages.
(Continued)

*Primary Examiner* — Kevin C. Harper
(74) *Attorney, Agent, or Firm* — Sage Patent Group

(57) ABSTRACT

Methods and apparatus in a communication system for search space switching are disclosed. A method performed by a network node in a communication system that includes more than one search space group includes generating a downlink control information, DCI, message, and transmitting the DCI message on a downlink control channel, wherein the DCI message causes a user equipment, UE, to switch from monitoring a first search space group to monitoring a second search space group in response to successfully decoding the DCI message. A method performed by a UE in the communication system, wherein the UE is configured to monitor a first search space group, includes receiving a DCI message on a downlink control channel; and
(Continued)

UE Specific Search Space

↓

Instances of UE Specific Search Space

C-RNTI
MCS-C-RNTI
SP-CSI-RNTI
CS-RNTI(s)
SL-RNTI
CL-CS-RNTI
SL-L-CS-RNTI switching from monitoring the first search space group to monitoring a second search space group in response to successfully decoding the DCI message.

22 Claims, 26 Drawing Sheets

(56)　　　　　　References Cited

U.S. PATENT DOCUMENTS

| | | | | |
|---|---|---|---|---|
| 2019/0342777 | A1 | 11/2019 | Tiirola et al. | |
| 2021/0127414 | A1* | 4/2021 | Abdoli | H04L 5/0055 |
| 2021/0136685 | A1* | 5/2021 | Sun | H04W 52/0209 |
| 2021/0144717 | A1* | 5/2021 | Tsai | H04W 8/24 |
| 2022/0210739 | A1* | 6/2022 | Yi | H04L 5/0037 |
| 2022/0360364 | A1* | 11/2022 | Li | H04W 76/28 |

OTHER PUBLICATIONS

Motorola Mobility, et al. "Feature lead summary #3 for NR-U DL Signals and Channels", R1-1913501, 3GPP Draft, Nov. 25, 2019, (XP051830779), 36 Pages.

Huawei, et al. "DL channels and signals in NR unlicensed band," R1-1911864, 3GPP Draft, Nov. 9, 2019, (XP051823046), 17 Pages.

Ericsson, "DL signals and channels for NR-U", R1-1912707, 3GPP Draft, Nov. 9, 2019, (XP051823551), 25 Pages.

* cited by examiner

Explicit Search Space Switching – Multiple Groups

Explicit Search Space Switching – Multiple Groups Extension

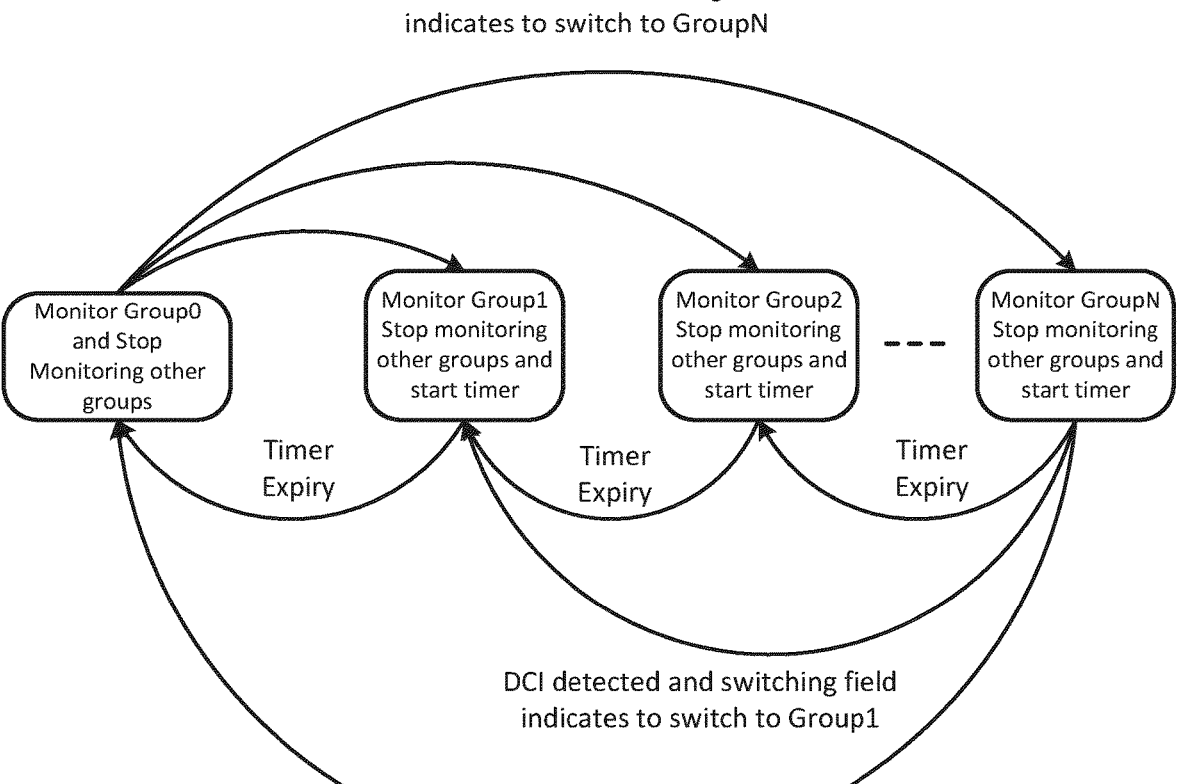

DCI detected and switching field
indicates to switch to GroupN

Monitor Group0
and Stop
Monitoring other
groups

Monitor Group1
Stop monitoring
other groups and
start timer

Monitor Group2
Stop monitoring
other groups and
start timer

Monitor GroupN
Stop monitoring
other groups and
start timer

Timer
Expiry

Timer
Expiry

Timer
Expiry

DCI detected and switching field
indicates to switch to Group1

DCI detected and switching field
indicates to switch to Group0

FIGURE 7C

Explicit Search Space Switching – Multiple Groups With Explicit Indication to Go Back Explicit Search Space Switching – Multiple Groups With Explicit Indication to Go Back Extension Implicit Search Space Switching – Multiple Groups Implicit Search Space Switching – Multiple Groups Extension <u>900</u>

Generating a DCI message that is scrambled using an identifier that is associated with a specific UE
902

Transmitting the DCI message on a downlink control channel
904

Generating a DCI message that is scrambled using an identifier that is associated with a plurality of UEs
1002

Transmitting the DCI message on a downlink control channel
1004

*FIGURE 10*

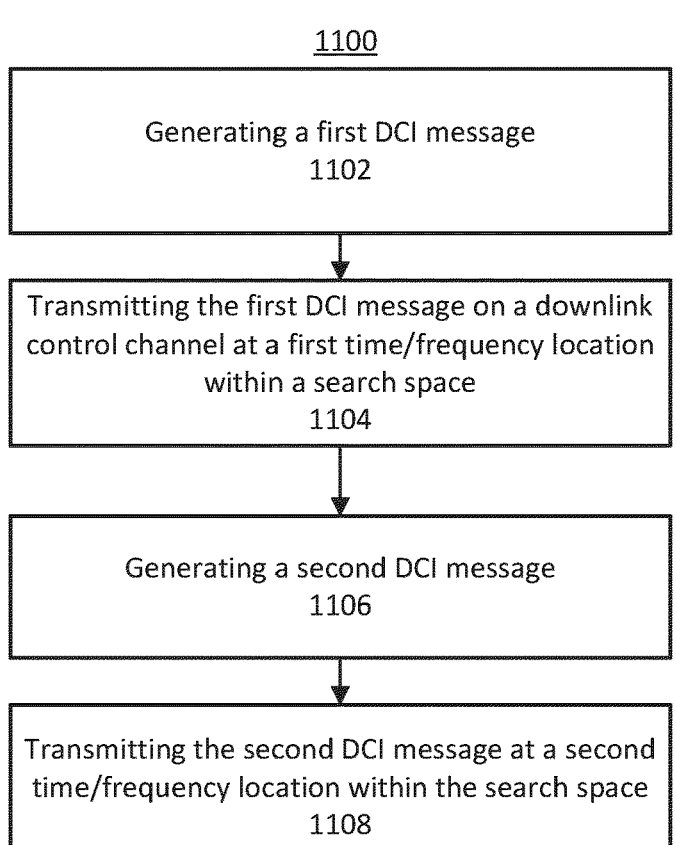

1100

Generating a first DCI message
1102

Transmitting the first DCI message on a downlink
control channel at a first time/frequency location
within a search space
1104

Generating a second DCI message
1106

Transmitting the second DCI message at a second
time/frequency location within the search space
1108

*FIGURE 11*

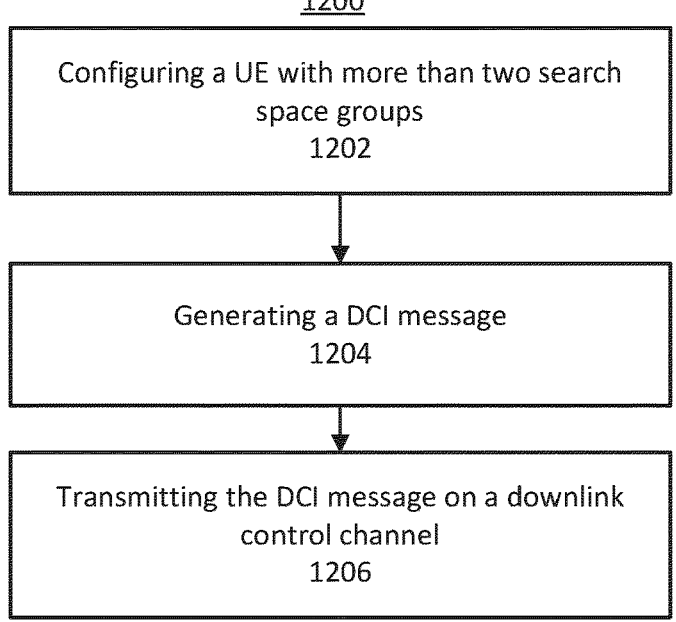

1200

Configuring a UE with more than two search
space groups
1202

Generating a DCI message
1204

Transmitting the DCI message on a downlink
control channel
1206

Figures 15, 16:
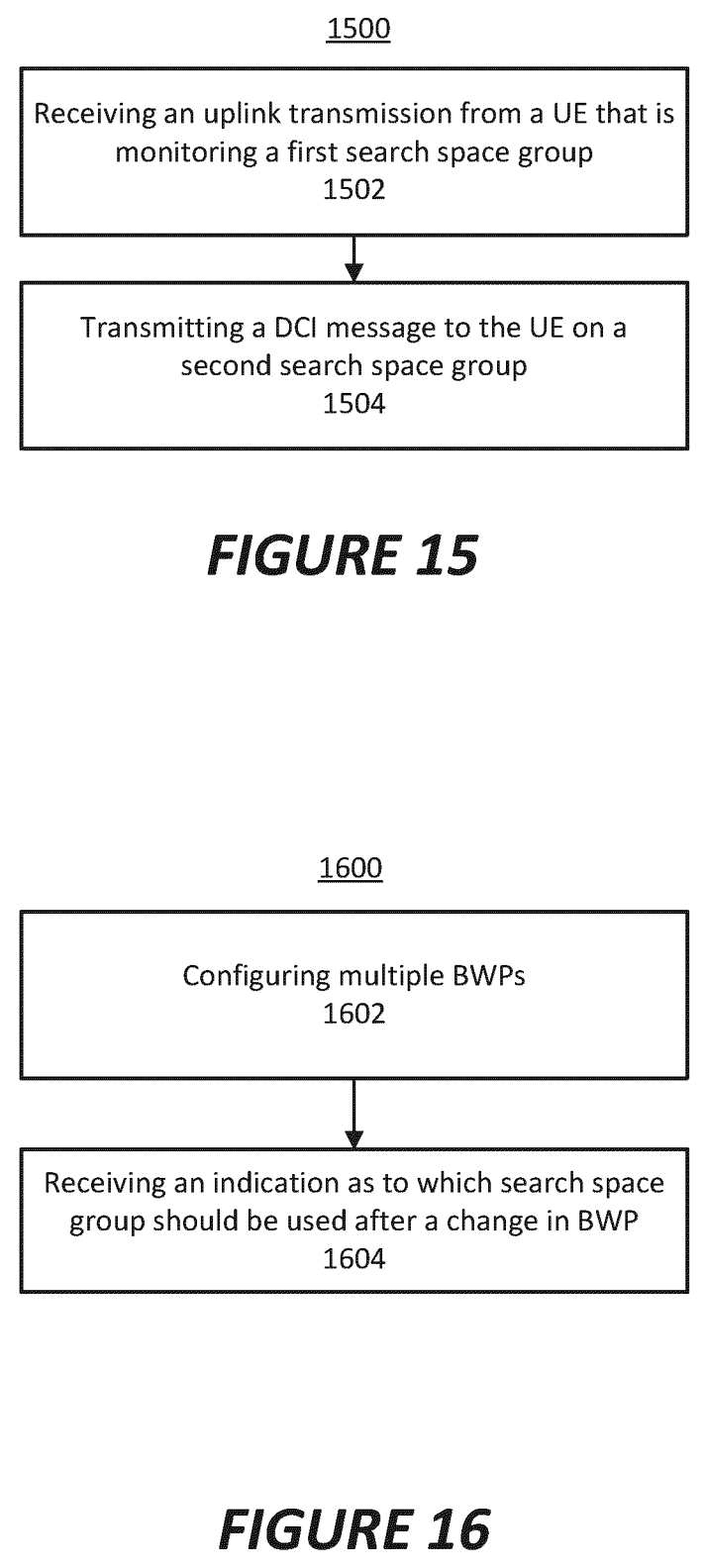

Receiving an uplink transmission from a UE that is
monitoring a first search space group
1502

Transmitting a DCI message to the UE on a
second search space group
1504

Configuring multiple BWPs
1602

Receiving an indication as to which search space
group should be used after a change in BWP
1604

Receiving a DCI message on a downlink control
channel
1702

Switching to monitoring from a first search space
group to a second search space group
1704

1800

Receiving a DCI message on a downlink control
channel
1802

Switching to monitoring from a first search space
group to a second search space group
1804

1900

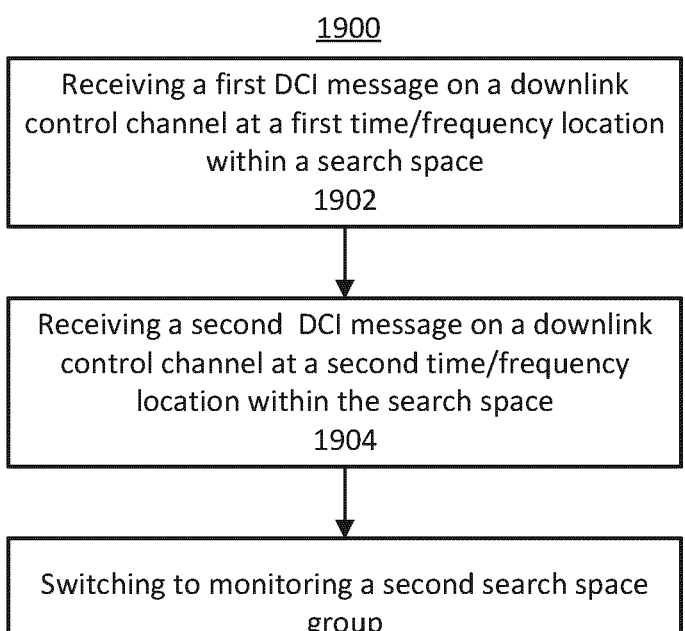

Receiving a first DCI message on a downlink control channel at a first time/frequency location within a search space
1902

Receiving a second DCI message on a downlink control channel at a second time/frequency location within the search space
1904

Switching to monitoring a second search space group
1906

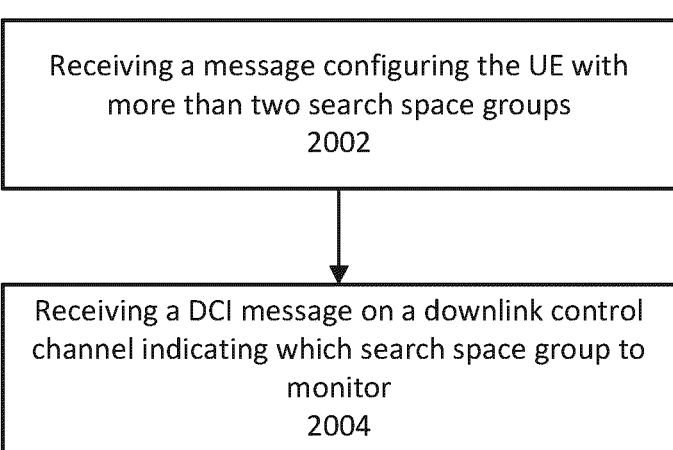

Receiving a message configuring the UE with more than two search space groups
2002

Receiving a DCI message on a downlink control channel indicating which search space group to monitor
2004

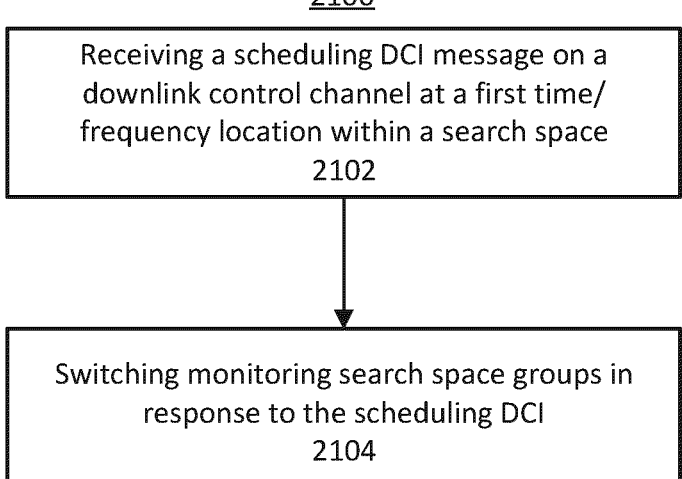

Receiving a scheduling DCI message on a downlink control channel at a first time/ frequency location within a search space
2102

Switching monitoring search space groups in response to the scheduling DCI
2104

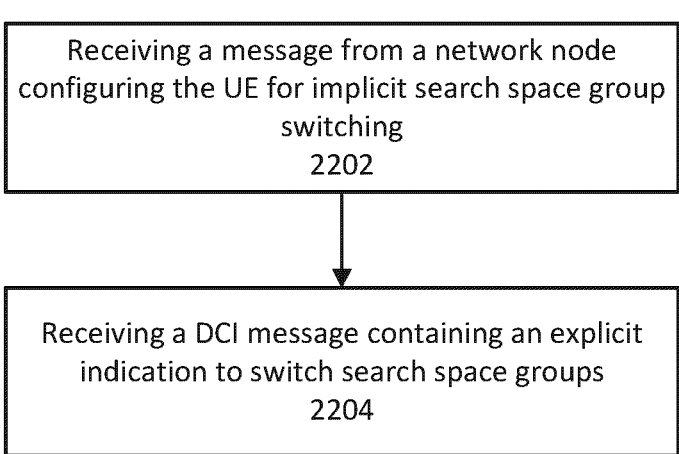

Receiving a message from a network node configuring the UE for implicit search space group switching
2202

Receiving a DCI message containing an explicit indication to switch search space groups
2204

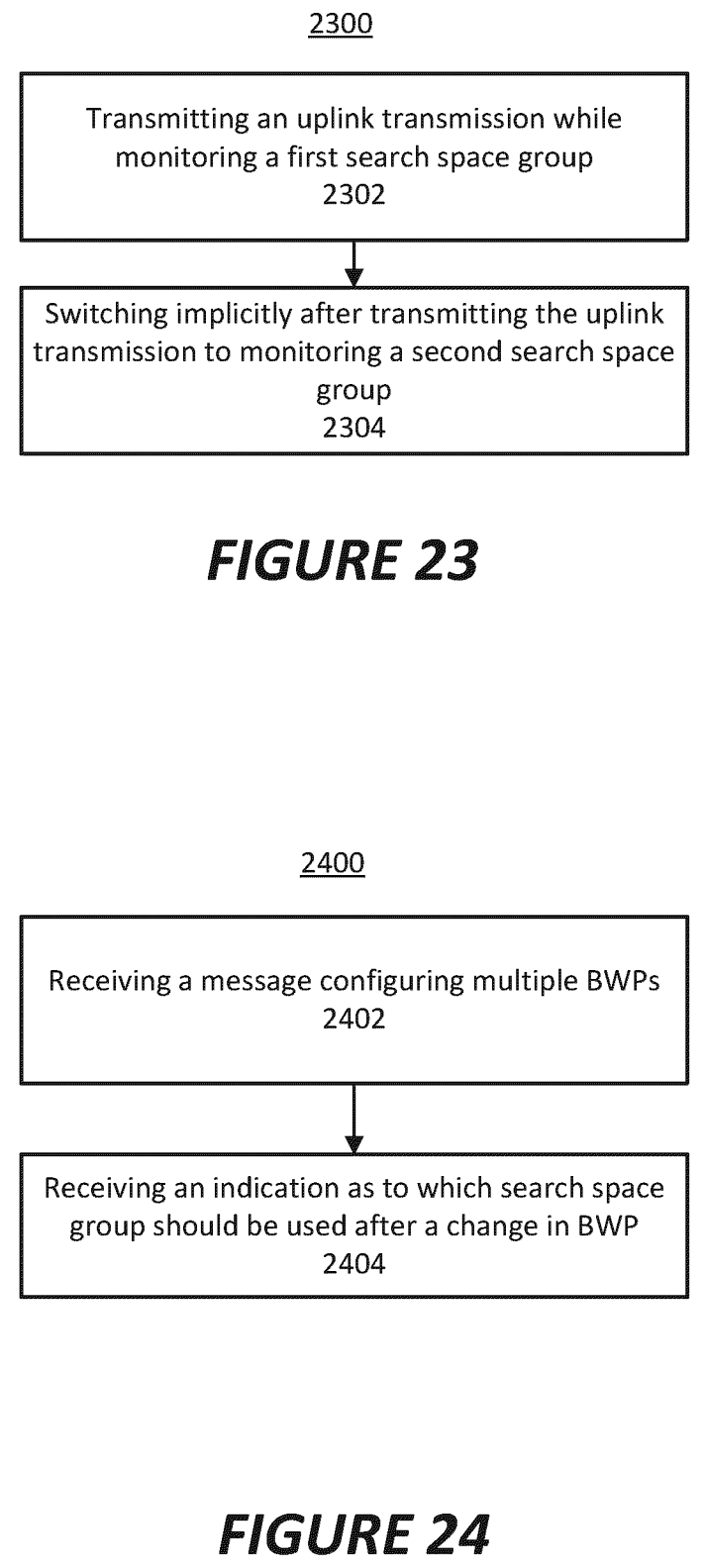

| Transmitting an uplink transmission while monitoring a first search space group 2302 |
| --- |

| Switching implicitly after transmitting the uplink transmission to monitoring a second search space group 2304 |
| --- |

| Receiving a message configuring multiple BWPs 2402 |
| --- |

| Receiving an indication as to which search space group should be used after a change in BWP 2404 |
| --- |

FIGURE 24

BEGIN

3110
Host computer provides user data

3120
Host computer initiates transmission carrying the user data to the UE

3130
UE receives the user data

END

METHODS AND APPARATUS FOR SEARCH SPACE SWITCHING

CROSS REFERENCE TO RELATED APPLICATIONS

This application is a 35 U.S.C. § 371 national stage application of PCT International Application No. PCT/EP2021/053545 filed on Feb. 12, 2021, which in turn claims domestic priority to U.S. Provisional Patent Application No. 62/976,511, filed on Feb. 14, 2020, the disclosures and content of which are incorporated by reference herein in their entirety.

TECHNICAL FIELD

The present disclosure relates generally to communications, and more particularly, to wireless communications and related wireless devices and network nodes for search space switching.

BACKGROUND

A simplified wireless communication system is illustrated in FIG. 1. The system includes a user equipment (UE) 10 that communicates with one or more access nodes 21, 22 using radio connections 11, 12. The access nodes 21, 22 are connected to a core network node 20. The access nodes 21-22 are part of a radio access network 25.

For wireless communication systems pursuant to 3GPP Evolved Packet System, EPS (also referred to as Long Term Evolution, LTE, or 4G) standard specifications, the access nodes 21, 22 correspond typically to an Evolved NodeB (eNB) and the core network node 20 corresponds typically to either a Mobility Management Entity (MME) and/or a Serving Gateway (SGW). The eNB is part of the radio access network (RAN) 105, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, such as specified in [6] and related specifications, the access nodes 21-22 correspond typically to a 5G NodeB (gNB) and the network node 20 corresponds typically to either an Access and Mobility Management Function (AMF) and/or a User Plane Function (UPF). The gNB is part of the radio access network 25, which in this case is the NG-RAN (Next Generation Radio Access Network), while the AMF and UPF are both part of the 5G Core Network (5GC).

FIG. 2 illustrates an example 5G system architecture. As shown in FIG. 1, functional entities (e.g., AMF, SMF, etc.) are connected to a logical communication bus. The Access and Mobility Management Function (AMF) communicates with the radio access network (RAN) and one or more user equipments (UE), and the session management function (SMF) communicates with the user plane function (UPF). This way of modelling the system is also known as "service-based architecture."

In RRC connected mode, a UE monitors the physical downlink control channel, PDCCH, for downlink control information, DCI, messages that can contain, for example, uplink scheduling grants. PDCCH monitoring in active time is one of the most power-consuming processing categories in a UE. In fact, monitoring for PDCCH in the absence of data may be the dominant cause of energy consumption in eMBB in typical scenarios. It is desirable to reduce PDCCH monitoring time intervals (to allow more deep sleep) and instantaneous monitoring durations (e.g. for more micro-sleep).

In NR Rel-15, 3GPP introduced a CORESET/SS framework to control PDCCH monitoring parameters for a UE in detail, via dedicated RRC configuration. Rel-15 also offered per-BWP configuration and a BWP switching mechanism that can be used for more rapid SS reconfiguration.

In Rel-16, 3GPP further introduced the NR-U SS group switching mechanism. The mechanism is described as follows in Sec. 10.4 of 38.213 v16.0.0:

<Begin Extract>

Search Space Set Switching

A UE can be provided a group index for a respective search space set by searchSpaceGroupIdList-r16 for PDCCH monitoring on a serving cell indicated by searchSpaceSwitchingGroup-r16. If the UE is not provided searchSpaceGroupIdList-r16 for a search space set, or for PDCCH monitoring on a serving cell that is not indicated by searchSpaceSwitchingGroup-r16, the following procedures are not applicable for PDCCH monitoring according to the search space set.

A UE can be provided, by searchSpaceSwitchingTimer-r16, a timer value. The UE decrements the timer value by one after each slot in the active DL BWP of the serving cell where the UE monitors PDCCH for detection of DCI format 2-0.

If a UE is provided by SearchSpaceSwitchTrigger-r16 a location of a search space set switching field for a serving cell in a DCI format 2-0, as described in Clause 11.1.1, and detects DCI format 2-0 in a slot:

if the UE is not monitoring PDCCH according to search space sets with group index 0, the UE starts monitoring PDCCH according to search space sets with group index 0, and stops monitoring PDCCH according to search space sets with group index 1, on the serving cell at a first slot that is at least P1 symbols after the slot in the active DL BWP of the serving cell, if a value of the search space set switching field is 0.

if the UE is not monitoring PDCCH according to search space sets with group index 1, the UE monitors PDCCH according to search space sets with group index 1, and stops monitoring PDCCH according to search space sets with group index 0, on the serving cell at a first slot that is at least P1 symbols after the slot in the active DL BWP of the serving cell, and the UE sets the timer value to the value provided by searchSpaceSwitchingTimer-r16, if a value of the search space set switching field is 1.

if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least P1 symbols after a slot where the timer expires or after a last slot of a remaining channel occupancy duration for the serving cell that is indicated by DCI format 2-0.

If a UE is not provided SearchSpaceSwitchTrigger-r16 for a serving cell:

if the UE detects a DCI format by monitoring PDCCH according to a search space set with group index 0 in a slot, the UE starts monitoring PDCCH according to search space sets with group index 1, and stops monitoring PDCCH according to search space sets with group index 0, on the serving cell at a first slot that is at least P2 symbols after the slot in the active DL BWP of a serving cell, the UE sets the timer value to the value provided by searchSpaceSwitchingTimer-r16 if the UE detects a DCI format by monitoring PDCCH in any search space set.

if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least P2 symbols after a slot where the timer expires or, if the UE is provided a search space set to monitor PDCCH for detecting a DCI format 2-0, after a last slot of a remaining channel occupancy duration for the serving cell that is indicated by DCI format 2-0.

<End Extract>

A RAN1 parameter list related to the above functionality may be as shown in Table 1:

4 first search space group to monitoring the second search space group affects the entire cell group.

The cell group may include a primary cell and a secondary cell.

The DCI message may be scrambled using an identifier that is associated with a plurality of UEs that are configured to monitor the first search space group and to switch to monitoring the second search space group in response to successfully decoding the DCI message, and wherein the DCI message may include an indication of one or more UEs of the plurality of UEs to which the DCI message applies.

The indication may include one or more bits in the DCI message.

The indication may include a time/frequency location at which the DCI message is located in the search space.

The DCI message may include a first DCI message transmitted on the downlink control channel at a first time/frequency location, and the method may further include generating a second downlink control information, DCI, message, and transmitting the second DCI message on the downlink control channel at a second time/frequency loca-

TABLE 1

| RAN parameter list for PDCCH Search Space Configuration | |
| --- | --- |
| searchSpaceGroupIdList-r16 | If configured, it provides a list of search space group IDs to which the search space set is associated. If configured, one bit field is added to DCI 2-0 for search space group switching for a group of serving cells. |
| searchSpaceSwitchingGroup-r16 | The serving cells in the group will be bundled for the search space group switching purpose One more groups can be configured, maximum is FFS For a configured search space switching group, if one cell is switched to a search space group, all other cells in the same serving cell group will be switched to that search space group. At most one serving cell in a cell group is configured with SearchSpaceSwitchTrigger-r16. |
| searchSpaceSwitchingGroupList-r1 | List of groups of serving cells (not part of RAN1 parameter list) |
| searchSpaceSwitchTrigger-r16 | If configured, provides position in DCI of the bit field indicating search space switching flag for a group of serving cells in searchSpaceSwitchingGroup-r16. A list of SearchSpaceSwitchTrigger-r16 objects is configured for one or more groups of serving cells. {positionInDCI, [servingCellId or cell group ID]} |

SUMMARY

A method according to some embodiments performed by a network node in a communication system that includes more than one search space group includes generating a downlink control information, DCI, message, and transmitting the DCI message on a downlink control channel. The DCI message is configured to cause a user equipment, UE, to switch from monitoring a first search space group to monitoring a second search space group in response to successfully decoding the DCI message. The DCI message may be scrambled using an identifier that is associated with the UE.

The DCI message may include one of a scheduling DCI message and a non-scheduling DCI message, and wherein the identifier may include a C-RNTI, CS-RNTI or MCS-RNTI The first search space group may include one or more configured search space sets and wherein the second search space group has no configured search space sets.

The first search space group may include a plurality of cells of a cell group, such that switching from monitoring the tion, wherein the first and second DCI messages are scrambled using an identifier that is associated with a plurality of UEs that are configured to monitor the first search space group and to switch to monitoring the second search space group in response to successfully decoding the first or second DCI message.

The first DCI message and/or the second DCI message may be transmitted within a search space that is not included in the first search space group.

The first DCI message and/or the second DCI message may be transmitted within a search space that is included in the first search space group.

The identifier may include a SFI-RNTI.

A method of performed by a network node in a communication system according to some embodiments includes configuring a user equipment, UE, with more than two search space groups, generating a downlink control information, DCI, message, and transmitting the DCI message on a downlink control channel, wherein the DCI message includes an indication of which of the more than two search space groups the UE is to start monitoring in response to receiving the DCI message.

The UE may be instructed to stop monitoring a first search space group in response to the DCI message.

The DCI message may be transmitted within a search space that is not included in a first search space group that may include the first search space.

The DCI message may be transmitted within a search space that is included in a first search space group that may include the first search space.

The network node may configure the UE to start monitoring a first one of the more than two search space groups in response to the DCI message and to stop monitoring the first one of the more than two search space groups and start monitoring a second one of the more than two search space groups upon expiration of a timer.

The UE may be configured to start monitoring a first one of the more than two search space groups in response to the DCI message and to stop monitoring the first one of the more than two search space groups and start monitoring a second one of the more than two search space groups upon receipt of a further DCI message while monitoring the first one of the more than two search space groups.

The further DCI message may include an indication of the second one of the more than two search space groups.

The UE may be configured to start monitoring a first one of the more than two search space groups in response to the DCI message and to stop monitoring the first one of the more than two search space groups and start monitoring a second one of the more than two search space groups upon receipt of a further DCI message or expiration of a timer while monitoring the first one of the more than two search space groups.

The UE may be configured to start monitoring a first one of the more than two search space groups in response to the DCI message, to stop monitoring the first one of the more than two search space groups and start monitoring a second one of the more than two search space groups upon expiration of a timer, and to reset the timer and continue monitoring the first one of the more than two search space groups upon reception of a DCI message while monitoring the first one of the more than two search space groups.

A method performed by a network node in a communication system according to some embodiments includes generating a scheduling downlink control information, DCI, message, the scheduling DCI message containing an explicit indication to a user equipment, UE, to switch search space group monitoring to a different search space group, and transmitting the DCI message on a downlink control channel, wherein the UE switches monitoring search space groups in response to the explicit indication in the scheduling DCI message.

The scheduling DCI message may include a DCI message having DCI format 0-0, 1-0, 0-1, 1-1, 0-2, or 1-2.

The scheduling DCI message may include a dedicated bit field that carries the explicit indication.

The dedicated bit field may include a value that is mapped to a particular search space group of a plurality of search space groups.

The UE may be configured switch search space groups in response to the explicit indication following a predetermined delay.

The explicit indication may include an invalid value in a field of the DCI message.

In some embodiments, a timer may be associated to the explicit indication such that the UE will switch monitoring search space groups upon expiration of the timer unless a further scheduling DCI is received by the UE.

The DCI message may include a DCI format 2-6 message including a wakeup signal, wherein the explicit indication is carried after a UE specific wake-up bit and before an SCell dormancy indication.

A method performed by a network node in a communication system according to some embodiments includes configuring a user equipment, UE, for implicit search space group switching, generating a downlink control information, DCI, message, the DCI message containing an explicit indication to a user equipment, UE, and transmitting the DCI message to the UE, wherein the UE is configured to switch search space groups in response to the explicit indication.

A DCI format of the DCI message may be associated with a specific search space group, wherein the UE is configured to start monitoring the specific search space group associated with the DCI format of DCI message.

In some embodiments, a scrambling code used to scramble the DCI message may be associated with a specific search space group, and the UE may be configured to start monitoring the specific search space group associated with the scrambling code used to scramble the DCI message.

The scrambling code may include a radio network temporary identifier, RNTI.

A method performed by a network node in a communication system according to some embodiments includes receiving an uplink transmission from a user equipment, UE, that is monitoring a first search space group, and transmitting a downlink control information, DCI, message, to the UE on a second search space group to which the UE switched implicitly after transmitting the uplink transmission.

The second search space may be selected based on a DCI format of the DCI message.

A method performed by a network node in a communication system according to some embodiments includes configuring multiple bandwidth parts, BWPs, to share a single set of search space group definitions.

The method may further include receiving an indication from the communication system as to which search space group should be used after a change in BWP.

In some embodiments, a default search space group may be defined for each BWP.

The UE may be configured with a minimum scheduling offset for cross-slot scheduling.

In some embodiments, when a DCI is received by the UE that includes an explicit indication to switch search space groups, the DCI may further include an indication of cross slot scheduling mode.

In some embodiments, when the UE receives an implicit indication to switch search space groups, the UE may implicitly change cross slot scheduling mode.

Some embodiments provide a network node configured to perform operations according to any of the foregoing embodiments. A network node according to some embodiments includes a processing circuit, and a memory circuit coupled to the processing circuit, wherein the memory circuit includes computer readable program instructions that, when executed by the processing circuit, cause the network node to perform operations according to any of the foregoing embodiments.

Some embodiments provide a method performed by a user equipment, UE, in a communication system, wherein the UE is configured to monitor a first search space group. The method includes receiving a downlink control information, DCI, message on a downlink control channel, wherein the DCI message is scrambled using an identifier that is associated with the UE, and switching from monitoring the first search space group to monitoring a second search space group in response to successfully decoding the DCI message.

The identifier may include a C-RNTI. The DCI message may include a non-scheduling DCI message. The DCI message has a scheduling format.

The DCI message may be a dummy scheduling DCI message that does not contain scheduling information.

In some embodiments, the UE may include a first UE, wherein the DCI message is scrambled using an identifier that is associated with a plurality of UEs including the first UE that are configured to monitor the first search space group, and the DCI message may include an indication of one or more UEs of the plurality of UEs to which the DCI message applies, wherein the one or more UEs of the plurality of UEs may include the first UE.

The indication may include one or more bits in the DCI message. The indication may include a time/frequency location at which the DCI message is located in the search space.

The DCI message may include a first DCI message that is received on the downlink control channel at a first time/frequency location, and the method may further include receiving a second downlink control information, DCI, message on the downlink control channel at a second time/frequency location, wherein the first and second DCI messages are scrambled using an identifier that is associated with a plurality of UEs that are configured to monitor the first search space group, and switching to monitoring a second search space group in response to successfully decoding the first or second DCI message.

The first DCI message and/or the second DCI message may be transmitted within a search space that is not included in the first search space group or within a search space that is included in the first search space group. The identifier may include a SFI-RNTI.

The DCI message may identify a cell in the first search space group that is to be switched to the second search space group, and other cells in the first search space group are not switched to the second search space group.

In some embodiments, when the UE transmits an uplink request while monitoring the first search space group, the UE performs an implicit SS group switching from monitoring the first search space group to monitoring the second search space group.

The UE may be configured with a third search space group, and the method may further include receiving another downlink control information, DCI, message on a downlink control channel, wherein the DCI message is scrambled using an identifier that is associated with the UE, and switching from monitoring the second search space group to monitoring a third search space group in response to successfully decoding the DCI message.

In some embodiment, a timer configuration is provided for each search space group except the first search space group, wherein the timer configuration includes at least a timer value and a search space group to transition to upon timer expiry.

A method according to some embodiments performed by a user equipment, UE, in a communication system, includes receiving a message from a network node configuring the UE with more than two search space groups, and receiving a downlink control information, DCI, message on a downlink control channel, wherein the DCI message includes an indication of which of the more than two search space groups the UE is to start monitoring in response to receiving the DCI message.

The UE may stop monitoring a first search space group in response to the DCI message.

The DCI message may be transmitted within a search space that is not included in a first search space group that may include the first search space.

The DCI message may be transmitted within a search space that is included in a first search space group that may include the first search space.

The UE may be configured to start monitoring a first one of the more than two search space groups in response to the DCI message and to stop monitoring the first one of the more than two search space groups and start monitoring a second one of the more than two search space groups upon expiration of a timer.

The UE may be configured to start monitoring a first one of the more than two search space groups in response to the DCI message and to stop monitoring the first one of the more than two search space groups and start monitoring a second one of the more than two search space groups upon receipt of a further DCI message while monitoring the first one of the more than two search space groups.

The further DCI message may include an indication of the second one of the more than two search space groups.

The UE may be configured to start monitoring a first one of the more than two search space groups in response to the DCI message and to stop monitoring the first one of the more than two search space groups and start monitoring a second one of the more than two search space groups upon receipt of a further DCI message or expiration of a timer while monitoring the first one of the more than two search space groups.

The UE may be configured to start monitoring a first one of the more than two search space groups in response to the DCI message, to stop monitoring the first one of the more than two search space groups and start monitoring a second one of the more than two search space groups upon expiration of a timer, and to reset the timer and continue monitoring the first one of the more than two search space groups upon reception of a DCI message while monitoring the first one of the more than two search space groups.

A method according to some embodiments performed by a user equipment, UE, in a communication system, includes receiving a scheduling downlink control information, DCI, message, on a downlink control channel, the scheduling DCI message containing an explicit indication to the UE to switch search space group monitoring to a different search space group, and switching monitoring search space groups in response to the explicit indication in the scheduling DCI message.

The scheduling DCI message may include a DCI message having DCI format 0-0, 1-0, 0-1, 1-1, 0-2, or 1-2.

The scheduling DCI message may include a dedicated bit field that carries the explicit indication.

The dedicated bit field may include a value that is mapped to a particular search space group of a plurality of search space groups.

The UE may be configured switch search space groups in response to the explicit indication following a predetermined delay.

In some embodiments, a timer may be associated to the explicit indication such that the UE will switch monitoring search space groups upon expiration of the timer unless a further scheduling DCI is received by the UE.

The DCI message may include a DCI format 2-6 message including a wakeup signal, wherein the explicit indication is carried after a UE specific wake-up bit and before an SCell dormancy indication.

A method according to some embodiments performed by a user equipment, UE, in a communication system, includes receiving a message from a network node configuring the user equipment, UE, for implicit search space group switching, and receiving a downlink control information, DCI, message, the DCI message containing an explicit indication to the UE, wherein the UE is configured to switch search space groups in response to the explicit indication.

In some embodiments, a DCI format of the DCI message may be associated with a specific search space group, and the UE is configured to start monitoring the specific search space group associated with the DCI format of DCI message.

In some embodiments, a scrambling code used to scramble the DCI message may be associated with a specific search space group, and the UE is configured to start monitoring the specific search space group associated with the scrambling code used to scramble the DCI message.

The scrambling code may include a radio network temporary identifier, RNTI.

A method according to some embodiments performed by a user equipment, UE, in a communication system, includes transmitting an uplink transmission while monitoring a first search space group, and switching implicitly after transmitting the uplink transmission to monitoring a second search space group.

The second search space may be selected based on a DCI format of a DCI message that is triggered in response to the uplink transmission.

A method according to some embodiments performed by a user equipment, UE, in a communication system, includes receiving a message from a network node configuring multiple bandwidth parts, BWPs, to share a single set of search space group definitions.

The method may further include receiving an indication from the communication system as to which search space group should be used after a change in BWP.

In some embodiments, a default search space group may be defined for each BWP.

In some embodiments, the UE is configured with a minimum scheduling offset for cross-slot scheduling.

In some embodiments, when a DCI is received by the UE that includes an explicit indication to switch search space groups, the DCI further may include an indication of cross slot scheduling mode.

In some embodiments, when the UE receives an implicit indication to switch search space groups, the UE may implicitly change cross slot scheduling mode.

A user equipment, UE, according to some embodiments is configured to perform operations of any of the foregoing embodiments.

A user equipment, UE, according to some embodiments includes a processing circuit, and a memory circuit coupled to the processing circuit, wherein the memory circuit includes computer readable program instructions that, when executed by the processing circuit, cause the UE to perform operations according to any of the foregoing embodiments.

Some embodiments described herein provide enhancements to existing SS group switching procedures that may enable more flexible, dynamic, and/or low-overhead SS adaptation for PDCCH monitoring in active time. In particular, some embodiments described herein may enable more dynamic SS switching methods and/or lower related NW overhead, thereby increasing the opportunities for the NW to enable and enhance UE power savings opportunities in connected mode. As a result, the UE radio energy consumption for typical NR use cases may be reduced and battery lifetime may be increased.

BRIEF DESCRIPTION OF THE DRAWINGS

FIGS. 7A to 7D illustrate options for explicit switching between multiple search spaces.

FIGS. 9 to 16 are a flowcharts illustrating operations of a network node according to some embodiments of the inventive concepts.

FIGS. 17 to 24 are a flowcharts illustrating operations of a user equipment according to some embodiments of the inventive concepts.

DETAILED DESCRIPTION

Figure 1:
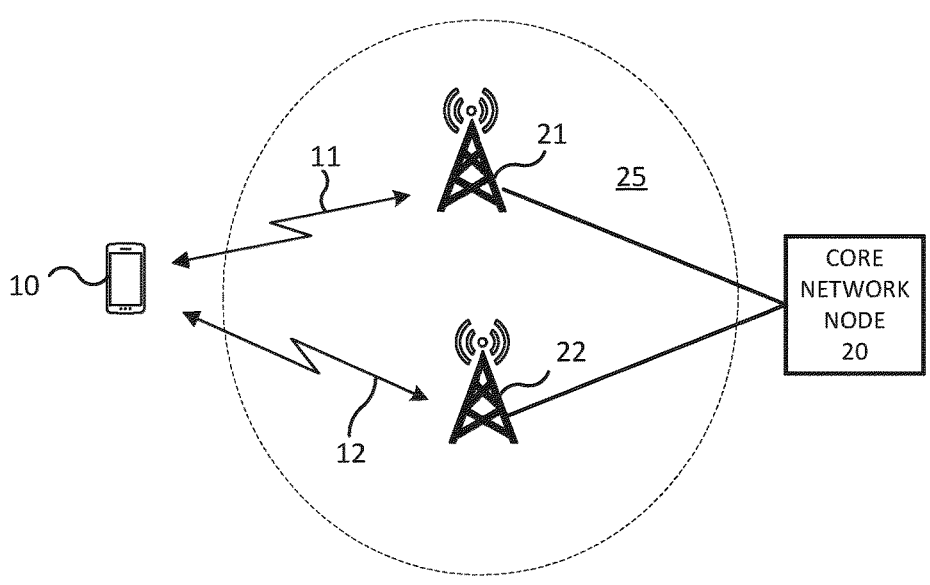
FIG. 1 illustrates a wireless communication system.
Figure 2:
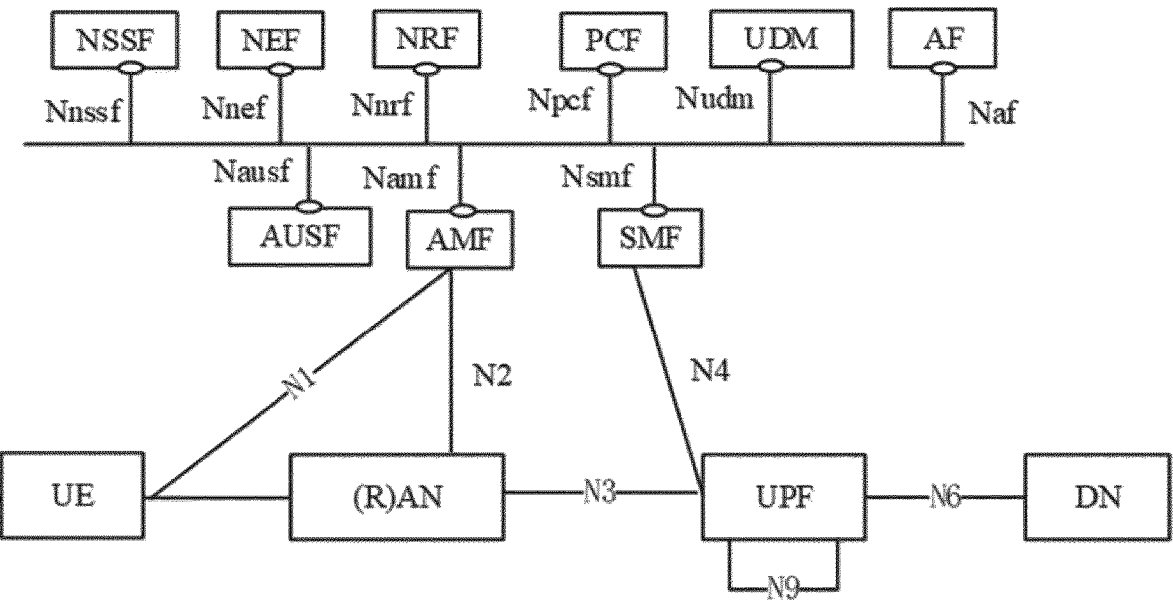
FIG. 2 illustrates an example 5G system architecture.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

While available Rel-15/16 mechanisms provide a certain level of functionality for search space (SS) switching, the solutions exhibit numerous limitations and side-effects. For example, bandwidth part (BWP) switching-based SS adaptation in principle allows switching between multiple SS configurations, but each switching instance incurs an additional delay that may exclude it as a useful method when the UE needs to immediately return to dense SS monitoring.

In addition, the Rel-16 scheme includes limitations, such as allowing switching only between two SS sets/groups and being configured for UE groups. Considering the new applications in Rel 16, particularly DC's related to URLLC, namely DCI 1-2 and DCI 0-2 which may need to be monitored on even a denser SS configuration with respect to the normal eMBB applications, more than two groups may be needed.

Additionally, the explicit mechanism in Rel-16 SS switching scheme necessitates separate PDCCH transmissions to provide the switching commands, reducing the remaining PDCCH capacity of the system.

Another problem for implicit switching is when cross-slot scheduling (x-slot) is configured. If the UE is configured with a min K0 of 1, and then an SS set change may be such that it has to monitor two SS per slot, or even denser, then this limits the UE capabilities to save power in X-slot as it always has to stay alert for a potential SS change.

Finally, none of the implicit schemes provide low-latency mechanisms for UE-originated UL traffic. Once the UE transmits an UL request, the sparse monitoring SS remain in effect for receiving the grant DCI, and only after that the dense SS can be utilized. This sets a possibly unattractive lower limit for UL transmission latency for the UE.

Due to these and other limitations, there is a need for further improvements to the SS adaptation mechanisms currently available in NR to enable more flexible SS switching between sparse and dense monitoring patterns, based on data arrival, and reduce the NW impact associated with the switching.

Some embodiments described herein provide enhancements to existing SS group switching procedures that may enable more flexible, dynamic, and/or low-overhead SS adaptation for PDCCH monitoring in active time. In particular, some embodiments described herein may enable more dynamic SS switching methods and/or lower related NW overhead, thereby increasing the opportunities for the NW to enable and enhance UE power savings opportunities in connected mode. As a result, the UE radio energy consumption for typical NR use cases may be reduced and battery lifetime may be increased.

The SS switching scheme defined in 3GPP Rel-16 provides an explicit switching mechanism and an implicit switching mechanism. These mechanisms will now be described.

Figure 3A:
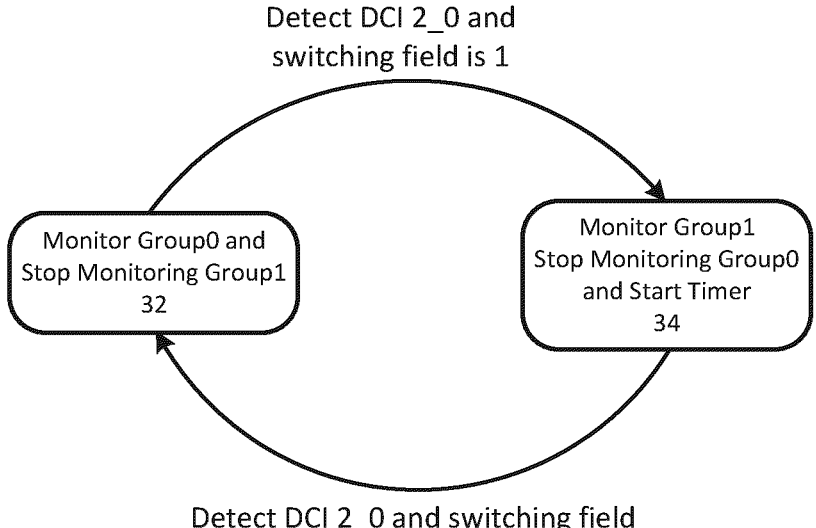
FIG. 3A is a state diagram that illustrates explicit search space set switching.

Two groups of search space sets can be configured in Rel-16. If configured through the RRC parameters searchSpaceGroupIdList-r16 and searchSpaceSwitchingGroup-r16, then the UE can be switched between these two groups using either explicit or implicit mechanisms A state diagram of the explicit switching procedure is illustrated in FIG. 3A. As shown therein, at any given time, a UE may be configured to monitor a first search space group (e.g. group0) or a second search space group (e.g., group1). The UE may be configured to monitor one search space group more densely than the other search space group. Thus, it may require less energy to monitor one search space group relative to the other, but the latency associated with the more sparsely monitored search space group may be higher.

As shown in FIG. 3A, when the UE is in a first state 32 where it configured to monitor group0, then when the UE detects a DCI message having format 2-0 (referred to as DCI format 2-0, or more simply DCI 2-0) and the switching field searchSpaceSwitchTrigger is configured in the UE, the UE transitions to a second state 34 where it starts a timer, monitors group1 and stops monitoring group0. When the UE is in the second state 34, if it detects DCI 2-0 and the switching field is 0, or when the timer expires, the UE transitions back to the first state 32, starts monitoring group0 again, and stops monitoring group1.

Accordingly, the UE can be switched between the two search space groups through detection of DCI format 2-0. This is done by configuring the UE with the RRC parameter searchSpaceSwitchTrigger-r16 which provides a location for the search space switching field (for a serving cell) in the DCI format 2-0. The search-space-set-switching field is one bit in size, where a bit value of zero indicates one group and a value of one indicates the second group. In the rest of this description, these two are referred to as group0 and group1, where the search-space-set-switching field takes the values zero and one, respectively. However, it will be appreciated that these names are arbitrary.

In more detail, the procedure for explicit switching using DCI format 2-0 is as follows. If the UE is not monitoring PDCCH on search space sets corresponding to group0 and the UE detects DCI format 2-0, then the UE switches to search space sets of group0 provided the search-space-set-switching field indicates a value of zero, and stops monitoring PDCCH on search space sets associated with group1.

If the UE is not monitoring PDCCH on search space sets corresponding to group1 and the UE detects DCI format 2-0, then the UE switches to search space sets of group1 provided the search-space-set-switching field indicates a value of one. The UE also stops monitoring PDCCH on search space sets corresponding to group0 and starts a timer with a duration provided by the searchSpaceSwitchingTimer.

If the UE is monitoring PDCCH on search space sets corresponding to group1, then the UE switches (or starts monitoring on) to search space sets of group0 and stops monitoring on group1 at either expiration of the searchSpaceSwitchingTimer or at the last slot of a remaining channel occupancy duration for the serving cell that is indicated by DCI format 2-0.

Figure 3B:
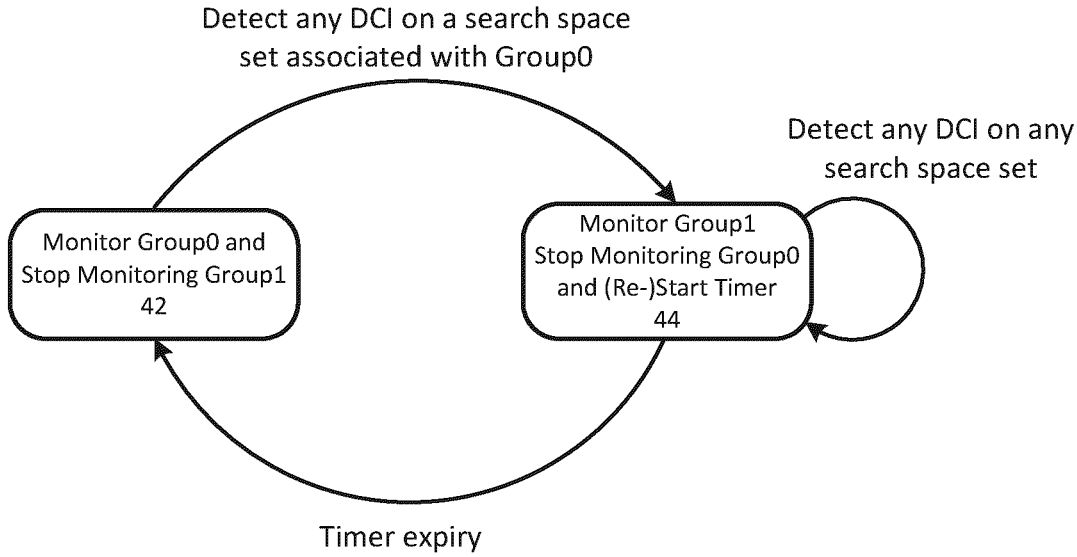
FIG. 3B is a state diagram that illustrates implicit search space set switching.

Implicit switching happens when the UE is not configured with the RRC searchSpaceSwitchTrigger-r16 parameter. Implicit switching is illustrated in FIG. 3B, in which the UE transitions between a first state 42 in which a first group (group0) is monitored and a second state 44 in which a second group (group1) is monitored. The procedure is as follows.

If the UE detects a DCI format by monitoring PDCCH according to a search space set with group index 0 in a slot, the UE starts monitoring PDCCH according to search space sets with group index 1, and stops monitoring PDCCH according to search space sets with group index 0, on the serving cell at a first slot that is at least P2 symbols after the slot in the active DL BWP of a serving cell, the UE sets the timer value to the value provided by searchSpaceSwitchingTimer-r16 if the UE detects a DCI format by monitoring PDCCH in any search space set. (For every subsequent detection of a DCI in any search space, and if the timer is running the UE restarts the timer).

If the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least P2 symbols after a slot where the timer expires or, if the UE is provided a search space set to monitor PDCCH for detecting a DCI format 2-0, after a last slot of a remaining channel occupancy duration for the serving cell that is indicated by DCI format 2-0.

Thus, even in the implicit case, it is still possible to enforce a group switch from group1 to group0 given that the UE has been configured with a search space configuration for DCI format 2-0. However, note that DCI format 2-0 is configured in the common search space and potentially affects group transitions for all UEs with the same SFI-RNTI that are decoding the DCI. That is, under prior approaches, group switching is not controlled on a per-UE basis.

Implicit search space set switching may be used for UE power savings. For example, to provide power savings for the UE, it is possible to do the following using the implicit approach.

A search space set is configured with sparse monitoring as group 0, and a single desired DCI-format is associated with this search space set. A search space set is configured with dense monitoring as group1. The scheduling DCI (e.g. DCI 1-1) is associated with search space sets that correspond to group1. This can be any of the DC's configured for the SS sets.

Upon reception of the desired DCI-format (i.e., any DCI that UE detects that is associated with group0), the UE then switches to search space sets associated with group1 and monitors the search spaces associated with that group. The timer value is set at this point. Upon reception of a subsequent DCI of any search space, then if the timer is running, the timer is restarted. The UE remains in group1 until the expiry of the timer or until the last slot of the remaining channel occupancy duration for the serving cell, as indicated by DCI format 2-0.

Figure 4A:
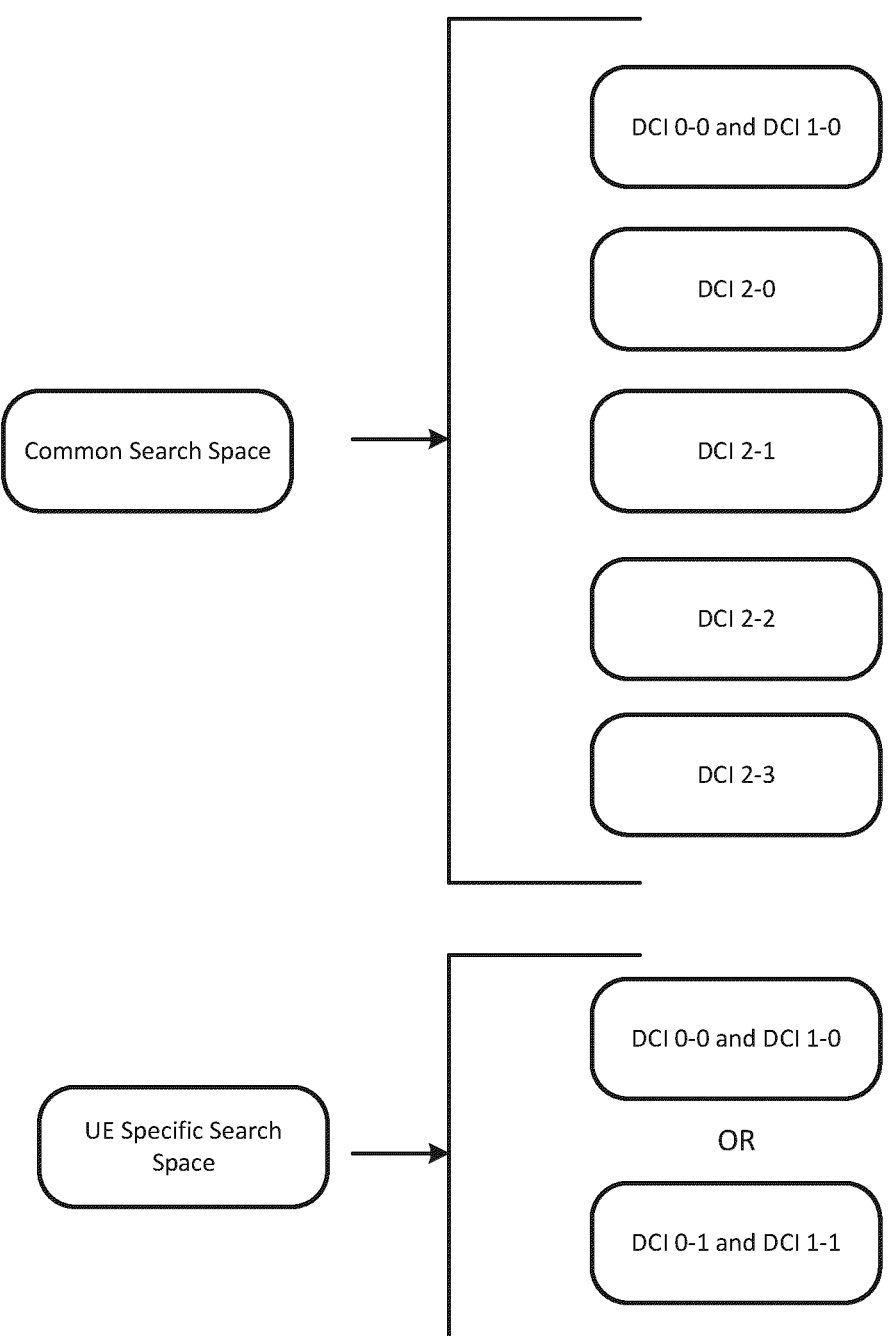
FIG. 4A illustrates DCI Formats monitored in a Search Space in NR Rel-15.
Figure 4B:
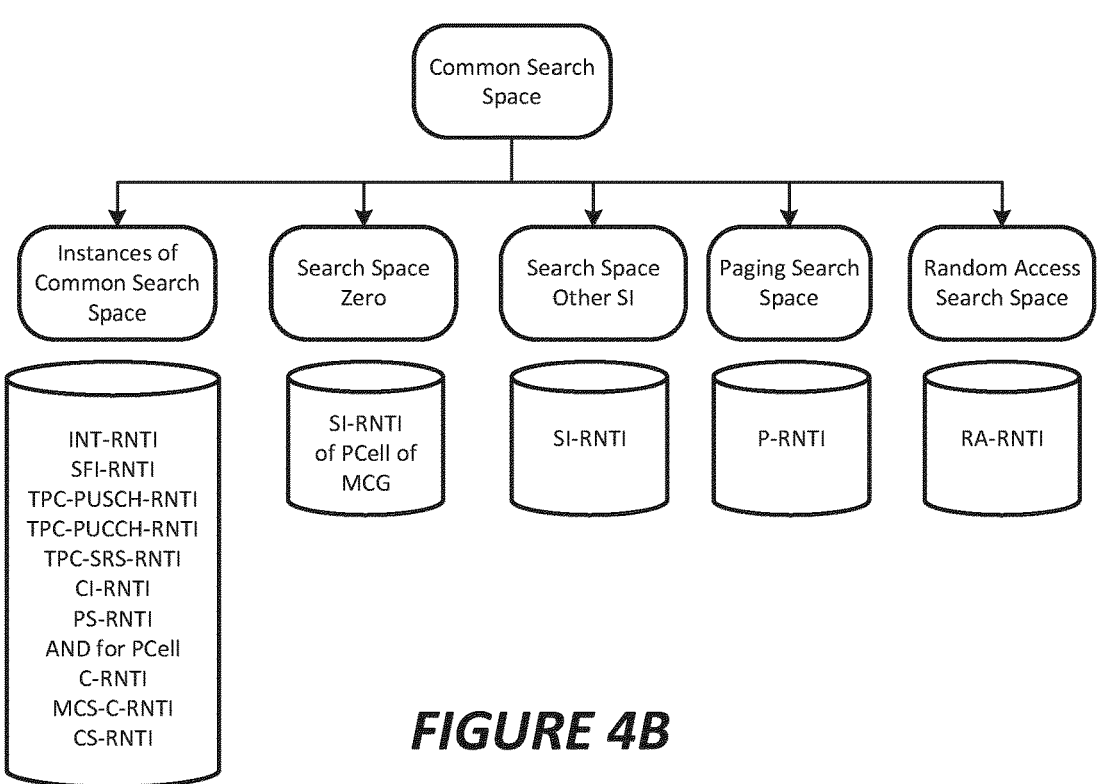
FIG. 4B illustrates search space types and RNTI associations.
Figure 4C:
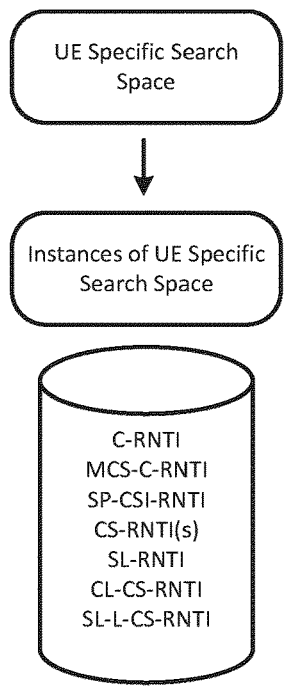
FIG. 4C illustrates UE specific search space and RNTI associations.

FIG. 4A illustrates DCI formats that are monitored in a search space as defined in Rel-15. FIG. 4B illustrates search space types and RNTI associations. FIG. 4C illustrates UE specific search spaces and RNTI associations.

Unless indicated otherwise, the use case of interest is using SS switching to alternate between different PDCCH monitoring patterns depending on the traffic arrival patterns. While the UE awaits initial data arrival, it preferably operates in a sparse monitoring mode when most, or a large fraction of, possible PDCCH symbol locations are not monitored and the UE can temporarily retire to a micro- or deep sleep mode. Once data arrives at L1, it is desirable to immediately transition to a dense monitoring mode where all or most PDCCH transmission possibilities are monitored. Once the data burst ends, the UE may immediately or after a delay return to sparse monitoring.

For brevity, the following description refers to a UE "monitoring SS group 0" (or gr0) which formally corresponds to the UE "monitoring PDCCH according to search space sets with group index 0", and similar terminology is used for monitoring group 1. Also, when referring to "DCI in group 0", this formally corresponds to "DCI specified in a search space set with group index 0".

In previous approaches, a UE could be configured with two search space groups—a first group that has a first set of search spaces (e.g. all SSs in which the UE monitors based on its C-RNTI), a second group that has no search spaces configured. An indicator in the DCI indicates that the UE should switch from monitoring first group (state 0) to monitoring second group (state 1). In state 1, the UE may not monitor PDCCH since there are no search spaces configured for second group. That is, the UE can pause PDCCH monitoring when it is in the second state. The UE can start a timer (T1) when switching from state 0 to state 1, and upon timer expiry the UE can switch to state 0 and resume monitoring the configured search spaces. The UE can consume less power in state 1 than in state 0.

The DCI may be a scheduling DCI with CRC scrambled by one of the following RNTIs: C-RNTI, MCS-C-RNTI, CS-RNTI. The DCI formats can be 0-1,1-1, 0-0, 1-0, etc. The timer value (T1) may be configured by upper layers. The timer value is configured for a scheduling DCI. The timer value can be distinct or independent of a timer value configured for triggering via DCI format 2-0.

UE-Specific SS Group Definition and SS Switch Signaling

In previous approaches, each SS switching group is configured to apply to one or more specified cells and/or BWPs. That is, SS lists are defined for each switching group (gr1 and gr0). One or two such switching groups may be defined. The switching DCI 2-0 is a group-common DCI. Thus, receiving the DCI 2-0 causes SS switching for all UEs in the group. However, the DCI 2-0 fields, e.g. SFI-RNTI, are configured individually for each UE via dedicated RRC. Thus, the dedicated configuration of DCI 2-0 can be used to control which UEs will respond to a switching command in DCI 2-0, however at the cost of using a potentially large number of SFI-RNTIs, mirroring the number of C-RNTIs, to be able to address individual UEs.

In one embodiment, the DCI 2-0 may, instead of being scrambled with SFI-RNTI, be scrambled by C-RNTI, or a function of C-RNTI, or a new UE specific RNTI related to a single targeted UE. This avoids the need to assign a large number of SFI-RNTIs in a cell to address individual UEs without affecting other UEs.

In one embodiment, different UEs may be configured to monitor different time/frequency locations, i.e. different UEs may have different SS settings, using same DCI 2-0 with same SFI-RNTI to effectively obtain a per-UE indicator of which DCI to respond to.

In another embodiment, within the DCI, a specific UE or group of UEs may be specified via indicator bits within the DCI. In this approach, only UEs that are addressed through such indications take the action to switch between the groups in response to the DCI. The UE assignment to groups may in this case be done through higher layer signaling.

In a related embodiment, explicit SS-switching may be performed using a UE-specific DCI which can be either existing scheduling DC's (e.g. DCI 0-0 and 1-0, 0-1, 1-1, 0-2, and 1-2), or a new DCI format. Furthermore, non-scheduling DC's or dummy scheduling uses of these DCI formats may be used, or new non-scheduling UE-specific DCI formats may be used. A dummy scheduling DCI is a DCI that has a format that is nominally used for scheduling uplink resources, but that contains no scheduling information. In other embodiments, unused, reserved, or additional bits in the respective DCI formats may be used for UE-specific indication and switching control.

In one embodiment, the SS groups (indicated by the searchSpaceSwitchingGroup-r16 IE) are configured UE-specifically. Note that some of the search spaces can themselves can already be UE-specific.

In previous approaches, if, for a UE, one cell in a searchSpaceSwitchingGroup-r16 is switched to a SS group, all other cells in the same switching group will be switched to that same SS group. According to some embodiments, switching one cell using its servingCellId in DCI 2-0 may only switch that cell and not other cells in the switching group. Switching SS groups using searchSpaceSwitching-Group-r16 in DCI 2-0 switches all cells in the switching group. In another embodiment, the DCI formats which can indicate a SS switch can be configured to either indicate a group change in a specific cell, or a cell group, or all the configured and/or activated cells.

In one embodiment, rather than having a single timer (Rel-16 searchSpaceSwitchingTimer) that switches SS groups, cell-specific or cell-group-specific timers may be introduced and configured. For example, cells belonging to frequency range 2 (FR2) can be configured with a shorter switching timer and upon inactivity (e.g., if there is no DCI reception related to these cells), these cells can revert to a sparse SS earlier than cells configured for frequency range 1 (FR1).

Referring to FIG. 9, a method (900) of operating a network node in a communication system according to some embodiments includes generating (902) a downlink control information, DCI, message, and transmitting (904) the DCI message on a downlink control channel which causes a UE to switch from a first search space group to a second search space group. In some embodiments, the DCI message is scrambled using an identifier that is associated with a specific user equipment, UE, that is configured to monitor the first search space group and to switch to monitoring from a first search space group to a second search space group in response to successfully decoding the DCI message.

In some embodiments, the identifier includes a C-RNTI. In some embodiments, the DCI message includes a non-scheduling DCI message. In some embodiments, the DCI message has a scheduling format. In some embodiments, the DCI message is a dummy scheduling DCI message that does not contain scheduling information.

Referring to FIG. 10, a method (1000) of operating a network node in a communication system according to some embodiment includes generating (1002) a downlink control information, DCI, message, and transmitting (1004) the DCI message on a downlink control channel. The DCI message is scrambled using an identifier that is associated with a plurality of user equipments, UEs, that are configured to monitor a first search space group and to switch to monitoring a second search space group in response to successfully decoding the DCI message, and wherein the DCI message includes an indication of one or more UEs to which the DCI message applies. In some embodiments, the indication includes one or more bits in the DCI message.

In some embodiments, the indication includes a time/frequency location at which the DCI message is located in the search space.

Referring to FIG. 11, a method (1100) of operating a network node in a communication system according to some embodiment includes generating (1102) a first downlink control information, DCI, message, transmitting (1104) the first DCI message on a downlink control channel at a first time/frequency location within a search space, generating (1106) a second downlink control information, DCI, message, and transmitting (1108) the second DCI message on the downlink control channel at a second time/frequency location. The first and second DCI messages are scrambled using an identifier that is associated with a plurality of user equipments, UEs, that are configured to monitor a first search space group and to switch to monitoring a second search space group in response to successfully decoding the first or second DCI message.

In some embodiments, the first DCI message and/or the second DCI message are transmitted within a search space that is not included in the first search space group.

In some embodiments, the first DCI message and/or the second DCI message are transmitted within a search space that is included in the first search space group.

In some embodiments, the identifier includes a SFI-RNTI.

Figure 17:
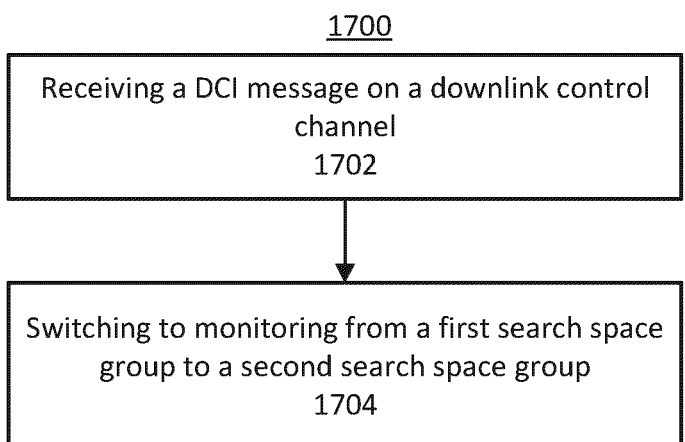

Referring to FIG. 17, a method (1700) of operating a user equipment, UE, in a communication system according to some embodiment includes receiving (1702) a downlink control information, DCI, message on a downlink control channel. In some embodiments, the DCI message is scrambled using an identifier that is associated with a specific UE that is configured to monitor the first search space group, and switching (1704) to monitoring from a first search space group to a second search space group in response to successfully decoding the DCI message.

Figure 18:
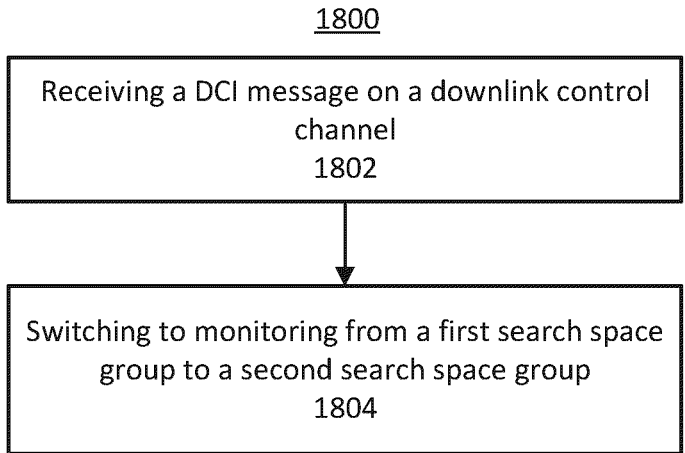

Referring to FIG. 18, a method (1800) of operating a user equipment, UE, in a communication system according to some embodiment includes receiving (1802) a downlink control information, DCI, message on a downlink control channel, wherein the DCI message is scrambled using an identifier that is associated with a plurality of user equipments, UEs, that are configured to monitor the first search space group, and switching (1804) from monitoring a first search space group to monitoring a second search space group in response to successfully decoding the DCI message, and wherein the DCI message includes an indication of one or more UEs of the plurality of UEs to which the DCI message applies.

Referring to FIG. 19, a method (1900) of operating a user equipment, UE, in a communication system according to some embodiment includes receiving (1902) a first downlink control information, DCI, message on a downlink control channel at a first time/frequency location within a search space, and receiving (1904) a second downlink control information, DCI, message on the downlink control channel at a second time/frequency location, wherein the first and second DCI messages are scrambled using an identifier that is associated with a plurality of user equipments, UEs, that are configured to monitor a first search space group, and switching (1906) to monitoring a second search space group in response to successfully decoding the first or second DCI message.

Switching Among More than 2 SS Groups

In previous approaches, two SS groups can be specified for a given SS switching group, which may limit the ability to optimize SS adaptation for UE power savings or other purposes.

In one embodiment, an SS switching group may specify more than two switching groups, e.g. 4 or 8 SS groups. The groups may be configured via dedicated RRC signaling.

In one embodiment, using the explicit mechanism, 2 or 3 bits in the DCI 2-0 (or in another DCI used for switching commands) are used to define the SS group number to which the UE receiving the DCI 2-0 should transition.

In another embodiment, the number of associated bits in the related DCIS, e.g., 1-1 and so on is configured automatically in association with the number of SS groups. For example, if the number of SS groups is 2, then one bit may be used, if 3-4 SS groups are defined, then 2 bits may be used, if 5-8 SS groups are defined, then 3 bits may be used, and so on.

In one embodiment, in the implicit mechanism or in the timer-based return aspect of the explicit mechanism, a timer configuration may be provided for each group other than gr0, including a separate timer value and the group index the UE should transition to.

Figure 8A:
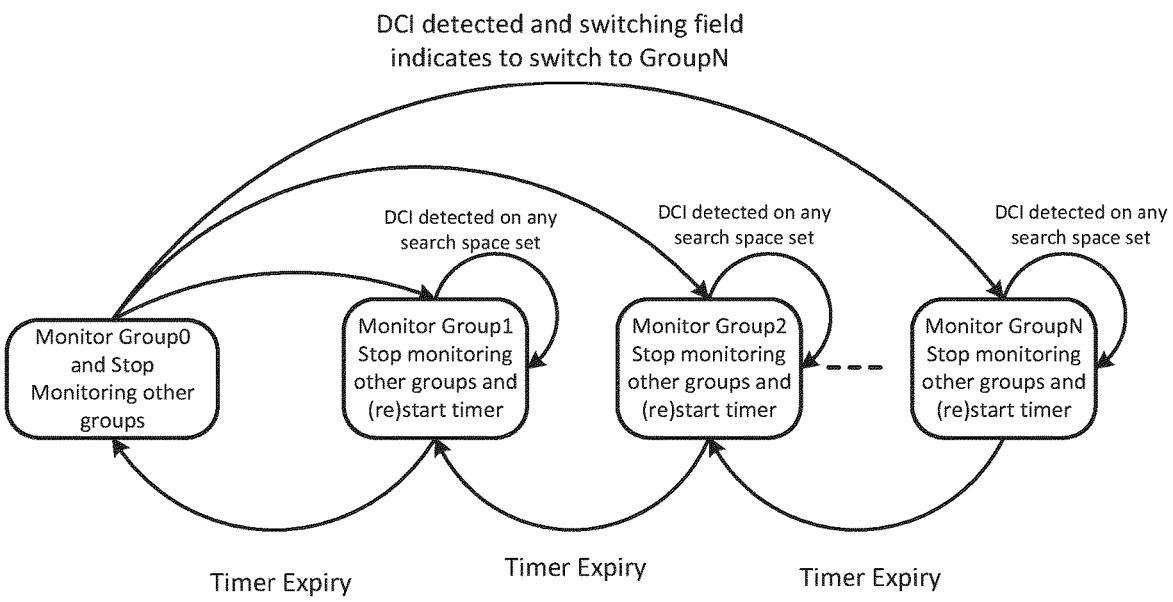
FIGS. 8A to 8B illustrate options for implicit switching between multiple search spaces.
Figure 8B:
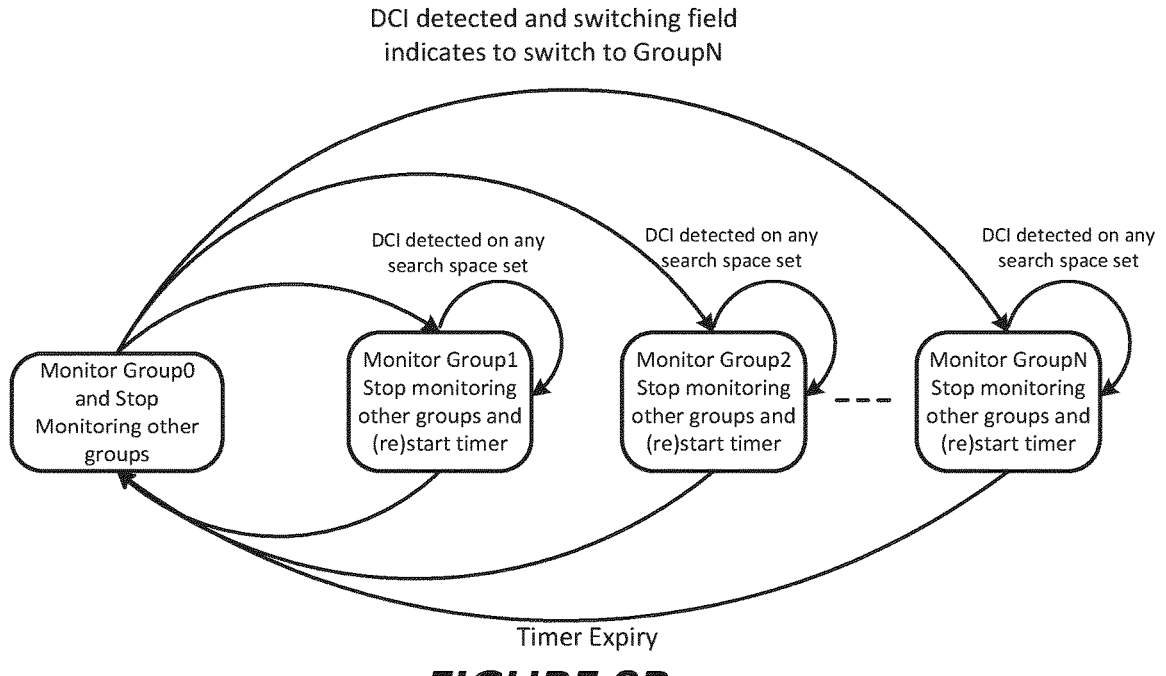

FIGS. 7A to 7D illustrate options for explicit switching between multiple search spaces. FIGS. 8A to 8B illustrate options for implicit switching between multiple search spaces.

Referring to FIG. 12, a method (1200) of operating a network node in a communication system according to some embodiment includes configuring (1202) a user equipment, UE, with more than two search space groups, generating (1204) a downlink control information, DCI, message, and transmitting (1206) the DCI message on a downlink control channel. The DCI message includes an indication of which of the more than two search space groups the UE is to start monitoring in response to receiving the DCI message.

In some embodiments, the UE is instructed to stop monitoring a first search space group in response to the DCI message.

In some embodiments, the DCI message is transmitted within a search space that is not included in a first search space group that includes the first search space.

In some embodiments, the DCI message is transmitted within a search space that is included in a first search space group that includes the first search space.

In some embodiments, the network node configures the UE to start monitoring a first one of the more than two search space groups in response to the DCI message and to stop monitoring the first one of the more than two search space groups and start monitoring a second one of the more than two search space groups upon expiration of a timer.

In some embodiments, the UE is configured to start monitoring a first one of the more than two search space groups in response to the DCI message and to stop monitoring the first one of the more than two search space groups and start monitoring a second one of the more than two search space groups upon receipt of a further DCI message while monitoring the first one of the more than two search space groups.

In some embodiments, the further DCI message includes an indication of the second one of the more than two search space groups.

In some embodiments, the UE is configured to start monitoring a first one of the more than two search space groups in response to the DCI message and to stop monitoring the first one of the more than two search space groups and start monitoring a second one of the more than two search space groups upon receipt of a further DCI message or expiration of a timer while monitoring the first one of the more than two search space groups.

In some embodiments, the UE is configured to start monitoring a first one of the more than two search space groups in response to the DCI message, to stop monitoring the first one of the more than two search space groups and start monitoring a second one of the more than two search space groups upon expiration of a timer, and to reset the timer and continue monitoring the first one of the more than two search space groups upon reception of a DCI message while monitoring the first one of the more than two search space groups.

Referring to FIG. 20, a method (2000) of operating a user equipment, UE, in a communication system according to some embodiment includes receiving (2002) a message from a network node configuring the UE with more than two search space groups, receiving (2004) a downlink control information, DCI, message on a downlink control channel. The DCI message includes an indication of which of the more than two search space groups the UE is to start monitoring in response to receiving the DCI message.

Explicit SS Switching Signaling Embedded in DCI Formats Other than 2-0

In previous approaches, explicit signaling of SS group switching is achieved via DCI 2-0, which is an additional PDCCH transmission using a non-scheduling DCI.

In one embodiment, an SS switching trigger signal may be embedded in a scheduling DCI (e.g. DCI 0-0 and 1-0, 0-1 and 1-1, as well as 0-2 and 1-2). Unused, reserved, or additional bits in the respective DCI formats may be used for attaching a switching command to a scheduling PDCCH. This allows performing SS switching without additional PDCCH transmissions and the resulting PDCCH capacity impact. For example, an additional bitfield can be configured in DCI 1-1 (and the same approach can be followed in others), where the bits in the bitfield can be mapped to different groups of SSs.

In an example, the network may configure three groups of SSs, namely, gr0, gr1, and gr2. As such, two bits can be configured in DCI 1-1 that map to a specific group. The example below shows one specific configuration:

00→gr0
01→gr1
10→gr2
11→reserved

The configuration is performed through higher layer signaling at the same time DCI format 1-1 is configured. Furthermore, the configuration may indicate clearly how the bits are mapped to different groups. Alternatively, the a maximum number of SS groups may be defined per band, cell, or BWP, and the bitmap is also clarified.

In a related embodiment, a specific application delay may also be considered for SS adaptation. That is, a specific delay may be provided after which the UE may transition from one SS group to another, so that the UE does not immediately transition. This is because, for example, if the switching trigger signal is embedded in a scheduling DCI, it may be desirable for the UE to switch after the scheduled resources are used.

For example, depending on the employed numerology, if DCI format 1-1 is received in a specific symbol, the SS adaptation should be implemented after X number of symbols in a specific numerology, e.g., after 3 symbols for 15 kHz, 6 for 30 kHz, 12 for 60 kHz, and 24 for 120 kHz. Different, e.g. larger application delays may be applied for x-carrier scheduling. Furthermore, the slot boundary may or may not apply in symbol counts.

In a related embodiment, instead of a specific bit field, the switching signal may be indicated by one or more invalid indices in the DCI, e.g., referring to a reserved MCS index.

In a related embodiment, a timer may be associated with the switching command conveyed in a scheduling DCI. If no further scheduling DCI is received before timer expiry, the UE will perform SS switching according to the received command. The timer may be used to control transition gr1→gr0. The timer, as other SS switching parameters and modes, may be configured via dedicated RRC signaling.

In another embodiment, a DCI format 2-6 or PDCCH-WUS (wake-up signal) may be expanded to carry an explicit trigger command in one or more DCI bits positions. The switching command in the WUS may be used, for example, to trigger a transition from gr0 to gr1. The bitmap configuration can follow the examples above, and the bitfield location can be after the UE specific wake-up indication bit, and before or after the SCell dormancy indication (if it is configured).

Figure 13:
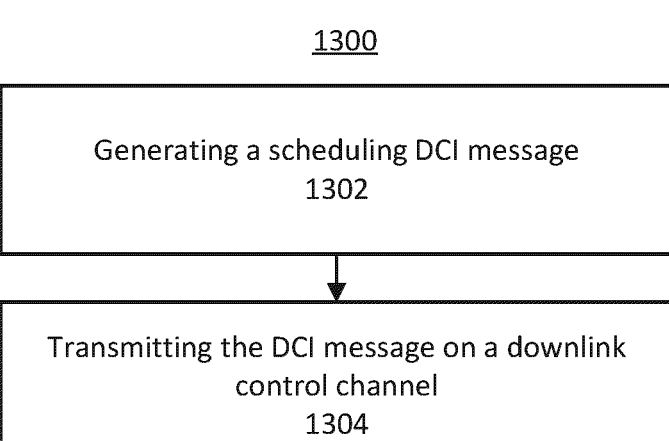

Referring to FIG. 13, a method (1300) of operating a network node in a communication system according to some embodiment includes generating (1302) a scheduling downlink control information, DCI, message, the scheduling DCI message containing an explicit indication to a user equipment, UE, to switch search space group monitoring to a different search space group, and transmitting (1304) the DCI message on a downlink control channel. The UE switches monitoring search space groups in response to the explicit indication in the scheduling DCI message.

In some embodiments, the scheduling DCI message includes a DCI message having DCI format 0-0, 1-0, 0-1, 1-1, 0-2, or 1-2.

In some embodiments, the scheduling DCI message includes a dedicated bit field that carries the explicit indication.

In some embodiments, the dedicated bit field includes a value that is mapped to a particular search space group of a plurality of search space groups.

In some embodiments, the UE is configured switch search space groups in response to the explicit indication following a predetermined delay.

In some embodiments, the explicit indication includes an invalid value in a field of the DCI message.

In some embodiments, a timer is associated to the explicit indication such that the UE will switch monitoring search space groups upon expiration of the timer unless a further scheduling DCI is received by the UE.

In some embodiments, the DCI message includes a DCI format 2-6 message including a wakeup signal, wherein the explicit indication is carried after a UE specific wake-up bit and before an SCell dormancy indication.

Referring to FIG. 21, a method (2100) of operating a user equipment, UE, in a communication system according to some embodiment includes receiving (2102) a scheduling downlink control information, DCI, message, on a downlink control channel, the scheduling DCI message containing an explicit indication to the UE to switch search space group monitoring to a different search space group, and switching (2104) monitoring search space groups in response to the explicit indication in the scheduling DCI message.

Extending Validity of SS Gr1 in Case of Explicit Switching

In previous explicit approaches, the UE remains in gr1 until an explicit command to transition to gr0 is received or a timer started by the DCI command with switching flag 1 expires.

In one embodiment, when the UE is in gr1, the UE may restart the gr1→gr0 timer upon receipt of a predetermined DCI command (e.g. DCI 2-0). The command may be, for example, a repeated command to transition to gr1 or a separate timer restart command. The command may contain a timer setting, indicated, for example, as an index into a list of possible settings provided via RRC.

In a related embodiment, upon receipt of any scheduling DCI, the timer of gr1→gr0 timer may be restarted. Alternatively, the timer of gr1→gr0 may be restarted upon receiving a scheduling DCI belonging to gr1.

In one embodiment, the network may configure the switching timer to be optional or the timer value can be allowed to have a very large duration to ensure that only an explicit DCI trigger will cause the UE to return to gr0. That is, the UE will remain in gr1 and will not transition to gr0 until it receives an explicit transition command.

In another embodiment, the same concept can be extended to any other SS groups. For example, if there are three groups, gr0, gr1, and g2, and gr0 is the default mode, i.e., after time expiration if an explicit command does not indicate to which group to move, the UE may move to gr0. In this case, if any DCI or specific DC's received in either group, the timer can be restarted.

In a related embodiment, different timers can be associated to different groups, e.g., gr 0 may not have a timer, gr1 is associated with timer 1 and gr2 is associated with timer 2, etc.

Additions to the Implicit Mechanism

In previous approaches, when the UE is configured for the implicit switching mechanism, the gr0→gr1 transition is only performed when a DCI in gr0 is received, and the gr1→gr0 transition is only performed when the gr1 timer expires.

In one embodiment, an explicit mechanism may also be invoked when the implicit mechanism is in effect. For example, a DCI 2-0 (or other non-scheduling DCI) carrying a switching command received while gr0 is in effect may also trigger transition to gr1, and a DCI 2-0 (or other DCI) carrying a switching command received while gr1 is in effect may also trigger transition to gr0. Other DCI formats, such as scheduling DCI formats, may also be used for the explicit gr1→gr0 command.

In prior approaches, in the implicit mode, receiving any DCI while in gr1 restarts the timer, as illustrated in FIG. 3B.

In one embodiment, only receiving a DCI in gr1 while in gr1 restarts the timer, while receiving other DC's does not restart it.

In another embodiment, different DC's may be associated with different SS groups, e.g., DCI 1-2 and 0-2 may be in gr2, and all other DC's are in gr1. In this case, for example, receiving a DCI 1-2 or DCI 0-2 can trigger the UE to move to gr2, while any other DCI would trigger a transition to gr1. Additionally, if the UE is in gr1, receiving DCI 1-2 or 0-2 can trigger a transition to gr2, or if the UE is in gr2, receiving any other DCI triggers a transition to gr1.

In all aspects of the above embodiments, the DC's triggering the switching from one group to another may further be associated with specific RNTIs. For example, the UE may be configured to switch from a certain group to another only if the decoded DCI is scrambled with C-RNTI but not MCS-RNTI. Alternately, the configuration may be defined in an exemptive manner such that all but specific RNTIs will trigger a group change. For example, it might not be desired from the network standpoint to switch a UE from a sparse SS group (say gr0) to a dense SS group (say gr1) in case the decoded DCI 1-0 is paging related (that is, the DCI is encoded with P-RNTI). Even more specific, in cases where UE grouping information is conveyed in the DCI (e.g., a WUS including grouping info), the UE may be configured such that it does not change SS groups unless the UE group information indicates that the message is addressing the specific group that the UE belongs to.

Figure 14:
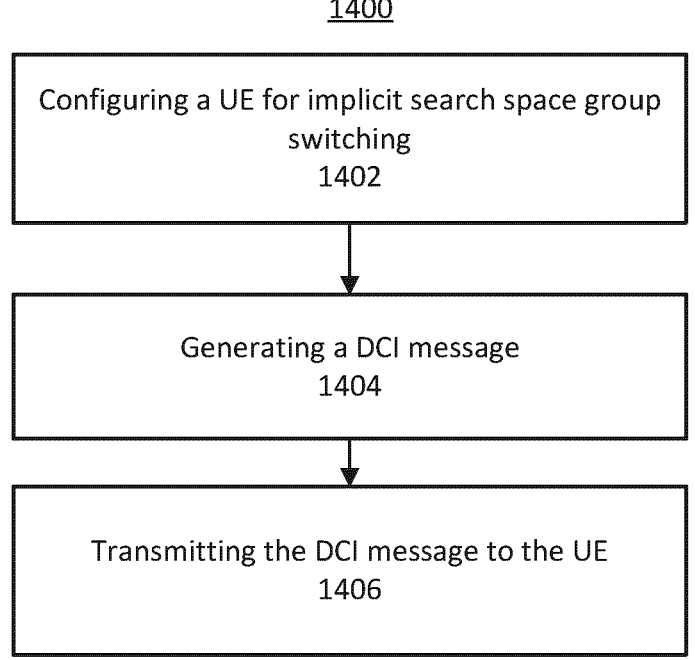

Referring to FIG. 14, a method (1400) of operating a network node in a communication system according to some embodiment includes configuring (1402) a user equipment, UE, for implicit search space group switching, generating (1404) a downlink control information, DCI, message, the DCI message containing an explicit indication to a user equipment, UE, and transmitting (1406) the DCI message to the UE. The UE is configured to switch search space groups in response to the explicit indication.

In some embodiments, a DCI format of the DCI message is associated with a specific search space group, and the UE is configured to start monitoring the specific search space group associated with the DCI format of DCI message.

In some embodiments, a scrambling code used to scramble the DCI message is associated with a specific search space group, and the UE is configured to start monitoring the specific search space group associated with the scrambling code used to scramble the DCI message.

In some embodiments, the scrambling code includes a radio network temporary identifier, RNTI.

Referring to FIG. 22, a method (2200) of operating a user equipment, UE, in a communication system according to some embodiment includes receiving (2202) a message from a network node configuring the user equipment, UE, for implicit search space group switching, and receiving (2204) a downlink control information, DCI, message, the DCI message containing an explicit indication to the UE. The UE is configured to switch search space groups in response to the explicit indication.

SS Switch Triggered by UL Request

In prior approaches, only DCI reception in the DL (for DL or UL scheduling or other command) can trigger explicit or implicit transition gr0→gr1. This may limit the ability of the UE to expediently receive a DCI UL transmission grant after an UL request In one embodiment, when UE transmits an UL request while in gr0, an implicit SS group switch gr0→gr1 is performed. The UE starts immediate DCI monitoring according to gr1 to receive a DCI granting PUCCH/PUSCH transmission. This solution shortens the UL grant delay from a potentially large inter-MO interval in gr0 to a short interval in gr1 and reduces the round-trip latency.

In a more general approach, the UE may be associated with different groups, and each UL request may also be associated with different groups. E.g., an UL request leading to DCI 0-0/0-1 may be associated to gr1, and an UL request leading to DCI 0-2 may be associated with gr2. As such if the UE request a UL leading to DCI 0-2, then it moves from gr0/g1→gr2, and similarly for other cases.

Referring to FIG. 15, a method (1500) of operating a network node in a communication system according to some embodiment includes receiving (1502) an uplink transmission from a user equipment, UE, that is monitoring a first search space group, and transmitting (1504) a downlink control information, DCI, message, to the UE on a second search space group to which the UE switched implicitly after transmitting the uplink transmission.

In some embodiments, the second search space is selected based on a DCI format of the DCI message.

Referring to FIG. 23, a method (2300) of operating a user equipment, UE, in a communication system according to some embodiment includes transmitting (2302) an uplink transmission while monitoring a first search space group, and switching (2304) implicitly after transmitting the uplink transmission to monitoring a second search space group.

SS Switching Behavior when BWP Switch Indicated in Scheduling DCI

The SS switching groups and their corresponding SS groups are configured per bandwidth part (BWP). If a scheduling DCI includes a BWP switch command, consistent SS group switching behavior should be ensured.

In one embodiment, multiple BWPs in a cell may be configured to share a single set of SS group definitions, i.e. a single IE contents is provided and utilized for multiple BWPs.

In another embodiment, a default SS group is defined for each BWP. If the SS groups for the originating and target BWPs are the equal, the SS group consistent with originating/target BWP is invoked after the DCI. If they are not equal the default SS group for the target BWP is invoked after the DCI.

In one embodiment, in DCI 1-1/0-1, in addition to BWP switch command, the network can additionally specify which SS group in the target BWP configuration the UE adopts after the BWP switch.

In one embodiment, in the implicit mechanism, if the UE entered gr1 from gr0 triggered by a scheduling DCI in BWP0 that included a BWP switch to BWP1, then if gr1 timer expires, the UE returns to the gr0 and BWP0. In other embodiments, other target BWPs may be specified, or no BWP change. The BWP switch behavior in conjunction with SS group switching may be configured via RRC signaling.

In another embodiment, when implicit mechanism is employed, if the UE is configured with multiple groups in the upcoming BWP, if the BWP change is the result of using a DCI, the received DCI indicates the group within which the upcoming BWP group should be monitored. E.g., if in the current BWP gr1 is monitored, and then e.g., a DCI 1-1 indicates a BWP change, this is counted as part of the state space of the upcoming BWP, i.e., a BWP change is received and thus the UE monitors gr1 in the upcoming BWP if DCI 1-1 is associated with that. In another embodiment, if BWP change is the result of BWP timer expiration, until the SS switching timer is running, the UE stays in the corresponding group in the upcoming BWP, e.g., gr1, if the current state is gr1.

In one example, the UE is in group 1 and DCI 1-1 indicates a BWP change in the next BWP. Then, in one embodiment, a DCI 2-0 is first transmitted by the NW to induce an SS group switch, followed by the scheduling DCI. In another embodiment, the UE is configured with and switches to a default SS group to monitor after the BWP switch. That group may be e.g. gr0.

Referring to FIG. 16, a method (1600) of operating a network node in a communication system according to some embodiment includes configuring (1602) multiple bandwidth parts, BWPs, to share a single set of search space group definitions.

In some embodiments, the method may further include receiving (1604) an indication from the communication system as to which search space group should be used after a change in BWP.

In some embodiments, a default search space group is defined for each BWP.

Referring to FIG. 24, a method (2400) of operating a user equipment, UE, in a communication system according to some embodiment includes receiving (2402) a message from a network node configuring multiple bandwidth parts, BWPs, to share a single set of search space group definitions, and receiving (2404) an indication as to which search space group should be used after a change in BWP.

Joint SS Switching and Cross-Slot Scheduling

In one scenario, in addition to SS switching, the UE may be configured with a minimum scheduling offset for cross-slot (x-slot) scheduling. In one embodiment, in case an explicit SS group switching mechanism is used, the UE can indicate the SS group as well as cross-slot scheduling mode at the same time, e.g., in DCI 1-1/0-1.

For example, if the minimum scheduling offset K0 is 2, the network may wish to switch the UE to a SS group with minimum SS periodicity of 2 slots as well to increase power savings. As a result, the UE may omit PDCCH monitoring end e.g. remain in micro-sleep during the x-slot delay duration.

In case of implicit mechanism, in one embodiment, the network may wish to configure a minimum scheduling offset (K0 or K2) per SS group instead or in addition to per BWP. For example, the network may configure a higher K0 for gr0 with sparser SS, and a lower one for gr1 with denser SS. Thereby, a change between the groups may automatically lead to a change in the cross-slot scheduling mode.

Alternatively, the UE may be configured so that a change in the cross-slot scheduling mode using e.g., DCI 1-1/0-1 may lead to a change in SS groups, e.g. allowing the UE to omit PDCCH monitoring during the x-slot delay.

Use of SS Switching Mechanism for Advanced Features

In one embodiment, when both DCI 2-0 (non-scheduling) triggering and implicit switching back to gr0 are configured for a UE in gr1, the UE may implement a L1-GTS (go to sleep) function. Gr0 may include only a sparse (WUS-like) PDCCH MO, e.g. once per on-duration, and no MO during the rest of the on-duration or IAT extension. To perform GTS at the end of a traffic burst, the NW transmits a gr0 switch command via DCI 2-0. The UE returns to gr0 without waiting for timer expiry and may enter deep sleep.

In one embodiment, WUS SS (for detecting DCI 2-6) is included in SS group 0 and implicit SS switching is configured. Upon receiving a WUS, the UE both starts monitoring the on-duration and also transitions to gr1 for immediate dense monitoring pattern. In a related embodiment, the SS group selection state is kept across DRX cycles, so only when WUS is detected, the UE switches to dense monitoring SS. These two approaches may also be applied when a virtual WUS function is implemented via special SS designs for scheduling DCIS.

In one embodiment, the implicit switching mechanism is used solely for scheduling PDCCH monitoring pattern adaptation, without affecting any other DCI reception. The network configures one SS with 0-1 and 1-1 which is sparse and assigns it to gr0, and a second SS also with DCI 0-1-And-1-1 which is dense and is assigned to gr1.

In one embodiment, the network may configure SS groups 0 and 1 separately and with different settings for each BWP in a cell. The network may then combine BWP switching signaling in a scheduling DCI and implicit and/or explicit SS switching mechanism to alternate between multiple SS group configurations.

In some embodiments, in the carrier aggregation context, the SS groups may be configured to include all cells in a cell group and the SS switching affects the entire per cell group, or so that a change in SS in PCell leads to a change in all of them. For example, a fall back to gr0 in PCell in implicit mechanism will cause a fall back in all the cells.

In an embodiment, for an Scell, the first group may include all search spaces configured for the SS, and the second group may have no search spaces configured. This allows NW to start and stop PDCCH monitoring for an Scell.

In some embodiments, the UE is configured with a minimum scheduling offset for cross-slot scheduling. In some embodiments, when a DCI is received by the UE that includes an explicit indication to switch search space groups, the DCI further includes an indication of cross slot scheduling mode. In some embodiments, when the UE receives an implicit indication to switch search space groups, the UE implicitly changes cross slot scheduling mode.

Figure 5:
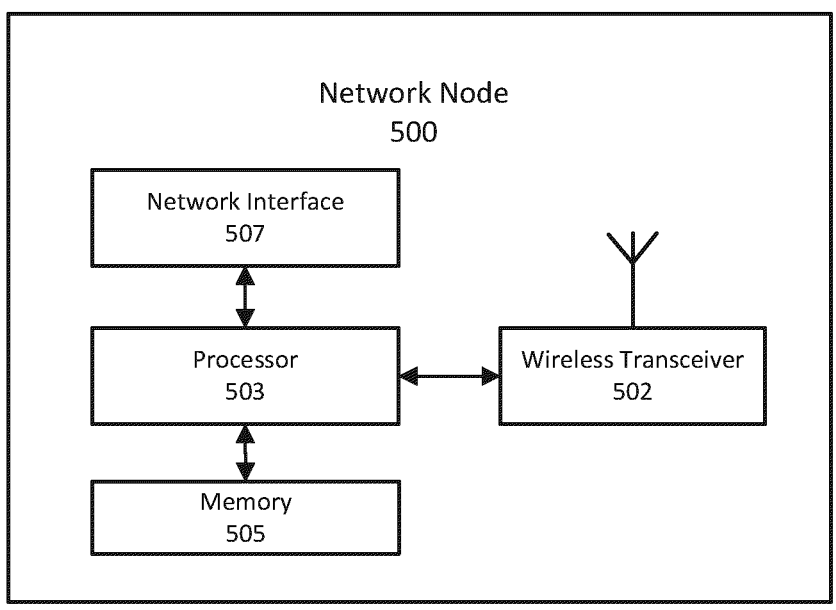
FIG. 5 is a block diagram illustrating a network node according to some embodiments of the inventive concepts.

FIG. 5 is a block diagram illustrating elements of a network node 500 of a communication system. The network node 500 may implement a RAN node and/or a CN node in the communication system. For example, the network node 500 may implement a gNodeB or eNodeB.

As shown, the network node may include a network interface 507 (also referred to as a network interface) configured to provide communications with other nodes (e.g., with other base stations, RAN nodes and/or core network nodes) of the communication network. The network node 500 may also include a wireless transceiver circuit 502 for providing a wireless communication interface with UEs. The network node 500 may also include a processing circuit 503 (also referred to as a processor) coupled to the wireless transceiver circuit 502 and the network interface 507, and a memory circuit 505 (also referred to as memory) coupled to the processing circuit. The memory circuit 505 may include computer readable program code that when executed by the processing circuit 503 causes the processing circuit to perform operations according to embodiments disclosed herein. According to other embodiments, processing circuit 503 may be defined to include memory circuitry so that a separate memory circuit is not required.

As discussed herein, operations of the network node may be performed by processing circuit 503, the wireless transceiver circuit 502 and/or the network interface 507. For example, the processing circuit 503 may control the network interface 507 to transmit communications through network interface 507 to one or more other network nodes and/or to receive communications through network interface from one or more other network nodes. Moreover, modules may be stored in memory circuit 505, and these modules may provide instructions so that when instructions of a module are executed by processing circuit 503, processing circuit 503 performs respective operations (e.g., operations discussed herein with respect to Example Embodiments).

Figure 6:
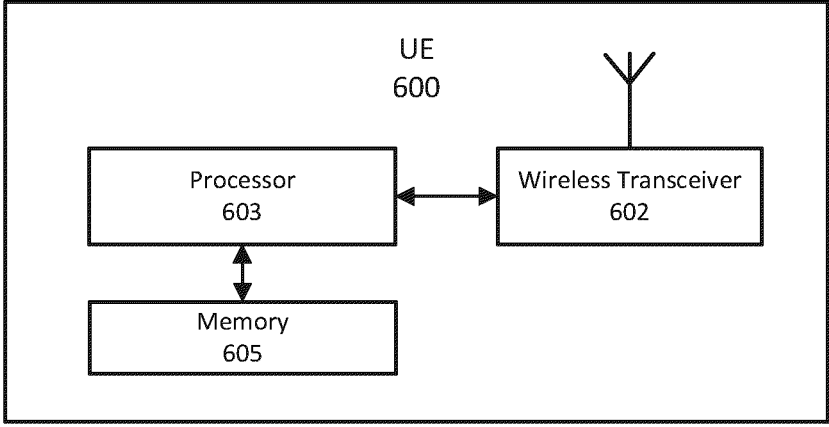
FIG. 6 is a block diagram illustrating a user equipment node according to some embodiments of the inventive concepts.
Figure 7A:
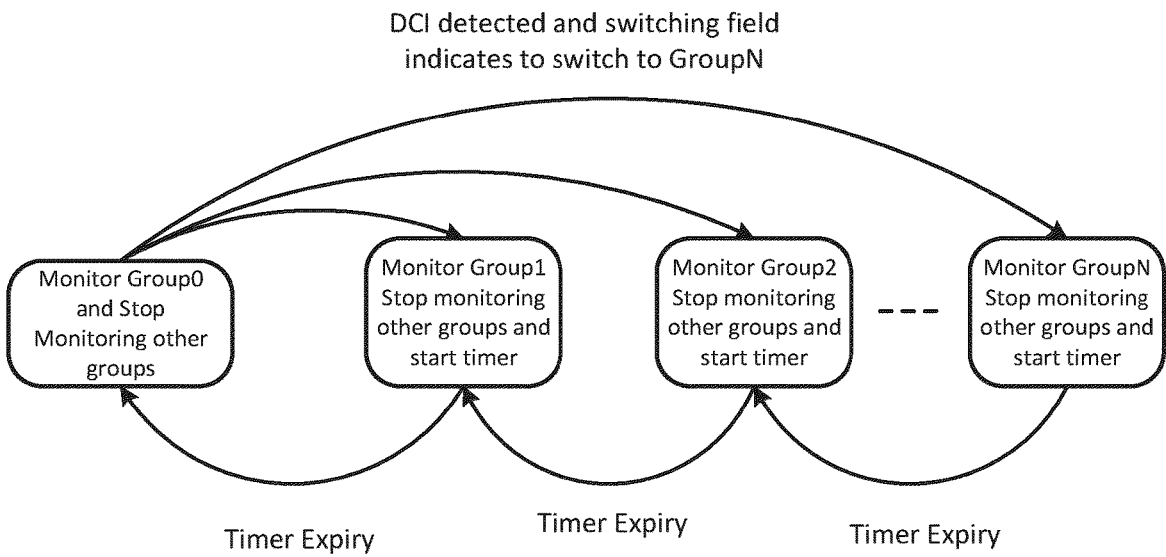
Figure 7B:
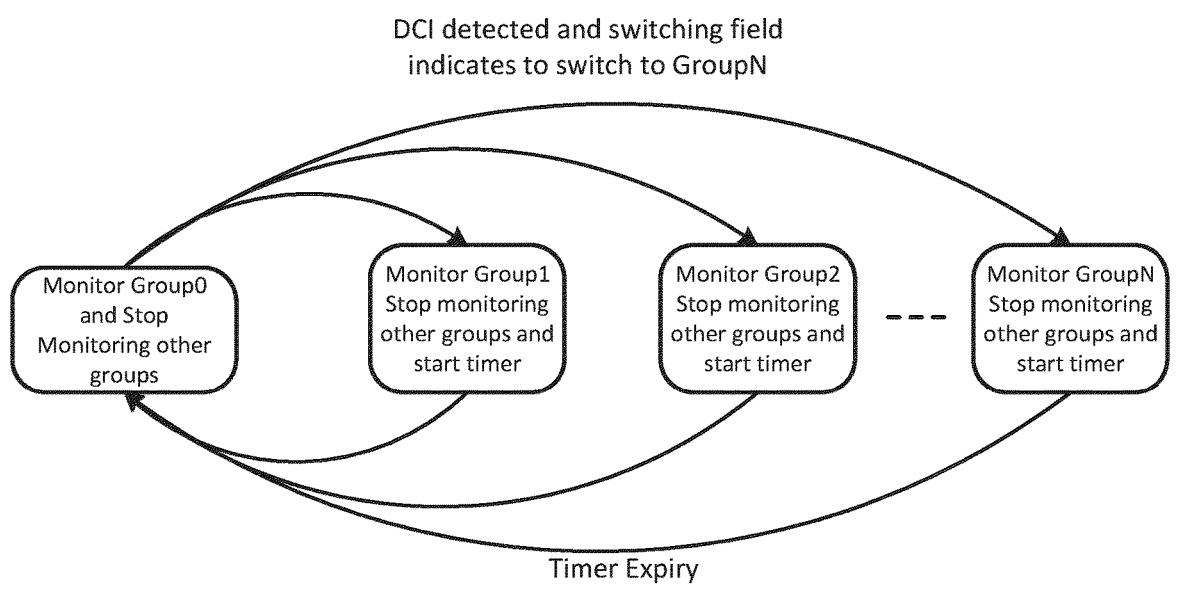
Figure 7D:
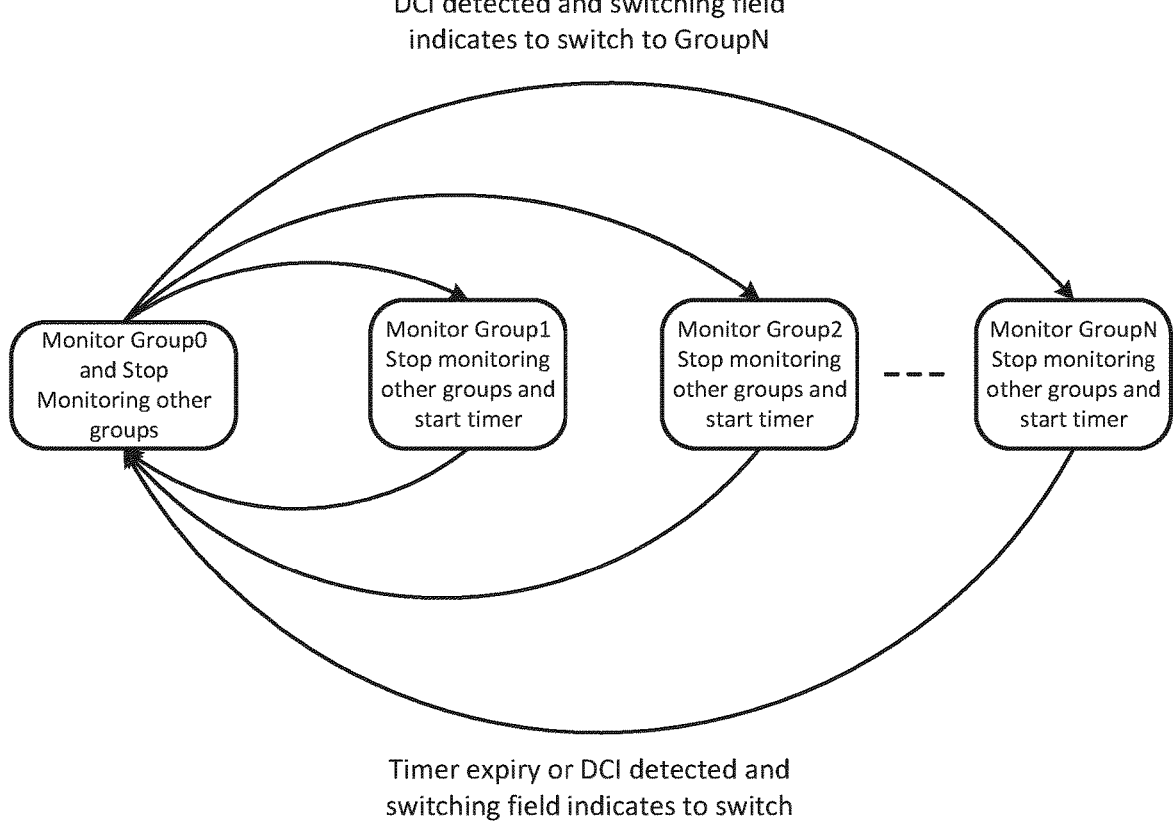

FIG. 6 is a block diagram illustrating elements of a UE 600 of a communication system. As shown, the UE may include a wireless transceiver circuit 602 for providing a wireless communication interface with a network. The UE 600 may also include a processing circuit 603 (also referred to as a processor) coupled to the wireless transceiver circuit 602 and the wireless transceiver circuit 602, and a memory circuit 605 (also referred to as memory) coupled to the processing circuit. The memory circuit 605 may include computer readable program code that when executed by the processing circuit 603 causes the processing circuit to perform operations according to embodiments disclosed herein. According to other embodiments, processing circuit 603 may be defined to include memory circuitry so that a separate memory circuit is not required.

As discussed herein, operations of the UE may be performed by processing circuit 603 and/or the wireless transceiver circuit 602. For example, the processing circuit 603 may control the wireless transceiver circuit 602 to transmit communications to a network node 500. Moreover, modules may be stored in memory circuit 605, and these modules may provide instructions so that when instructions of a module are executed by processing circuit 603, processing circuit 603 performs respective operations (e.g., operations discussed herein with respect to Example Embodiments).

FURTHER EXAMPLES

UE Specific SS Group Definition and SS Switch Signaling

Example 1. A method of operating a network node in a communication system, comprising: generating (902) a downlink control information, DCI, message; and transmitting (904) the DCI message on a downlink control channel; wherein the DCI message is scrambled using an identifier that is associated with a specific user equipment, UE, that is configured to monitor the first search space group and to switch to monitoring from a first search space group to a second search space group in response to successfully decoding the DCI message.

Example 2. The method of Example 1, wherein the identifier comprises a C-RNTI.

Example 3. The method of Example 1 or 2, wherein the DCI message comprises a non-scheduling DCI message.

Example 4. The method of any of Examples 1 to 3, wherein the DCI message has a scheduling format.

Example 5. The method of Example 4 wherein the DCI message is a dummy scheduling DCI message that does not contain scheduling information.

Example 6. A method of operating a network node in a communication system, comprising: generating (1002) a downlink control information, DCI, message; and transmitting (1004) the DCI message on a downlink control channel; wherein the DCI message is scrambled using an identifier that is associated with a plurality of user equipments, UEs, that are configured to monitor a first search space group and to switch to monitoring a second search space group in response to successfully decoding the DCI message, and wherein the DCI message comprises an indication of one or more UEs of the plurality of UEs to which the DCI message applies.

Example 7. The method of Example 6, wherein the indication comprises one or more bits in the DCI message.

Example 8. The method of Example 6, wherein the indication comprises a time/frequency location at which the DCI message is located in the search space.

Example 9. A method of operating a network node in a communication system, comprising: generating (1102) a first downlink control information, DCI, message; and transmitting (1004) the first DCI message on a downlink control channel at a first time/frequency location; generating (1106) a second downlink control information, DCI, message; and transmitting (1108) the second DCI message on the downlink control channel at a second time/frequency location; wherein the first and second DCI messages are scrambled using an identifier that is associated with a plurality of user equipments, UEs, that are configured to monitor a first search space group and to switch to monitoring a second search space group in response to successfully decoding the first or second DCI message.

Example 10. The method of Example 9, wherein the first DCI message and/or the second DCI message are transmitted within a search space that is not included in the first search space group.

Example 11. The method of Example 9, wherein the first DCI message and/or the second DCI message are transmitted within a search space that is included in the first search space group.

Example 12. The method of Example 9, wherein the identifier comprises a SFI-RNTI.

Switching Among More than 2 SS Groups Example 13. A method of operating a network node in a communication system, comprising: configuring (1202) a user equipment, UE, with more than two search space groups; generating (1204) a downlink control information, DCI, message; and transmitting (1206) the DCI message on a downlink control channel; wherein the DCI message includes an indication of which of the more than two search space groups the UE is to start monitoring in response to receiving the DCI message.

Example 14. The method of Example 13, wherein the UE is instructed to stop monitoring a first search space group in response to the DCI message.

Example 15. The method of Example 13 or 14, wherein the DCI message is transmitted within a search space that is not included in a first search space group that includes the first search space.

Example 16. The method of Example 13 or 14, wherein the DCI message is transmitted within a search space that is included in a first search space group that includes the first search space.

Example 17. The method of any of Examples 13 to 16, wherein the network node configures the UE to start monitoring a first one of the more than two search space groups in response to the DCI message and to stop monitoring the first one of the more than two search space groups and start monitoring a second one of the more than two search space groups upon expiration of a timer.

Example 17. The method of any of Examples 13 to 16, wherein the UE is configured to start monitoring a first one of the more than two search space groups in response to the DCI message and to stop monitoring the first one of the more than two search space groups and start monitoring a second one of the more than two search space groups upon receipt of a further DCI message while monitoring the first one of the more than two search space groups.

Example 18. The method of Example 17, wherein the further DCI message includes an indication of the second one of the more than two search space groups.

Example 19. The method of any of Examples 13 to 16, wherein the UE is configured to start monitoring a first one of the more than two search space groups in response to the DCI message and to stop monitoring the first one of the more than two search space groups and start monitoring a second one of the more than two search space groups upon receipt of a further DCI message or expiration of a timer while monitoring the first one of the more than two search space groups.

Example 20. The method of any of Examples 13 to 16, wherein the UE is configured to start monitoring a first one of the more than two search space groups in response to the DCI message, to stop monitoring the first one of the more than two search space groups and start monitoring a second one of the more than two search space groups upon expiration of a timer, and to reset the timer and continue monitoring the first one of the more than two search space groups upon reception of a DCI message while monitoring the first one of the more than two search space groups.

Explicit SS Switching Signaling Embedded in DCI Formats Other than 2-0

Example 21. A method of operating a network node in a communication system, comprising: generating (1302) a scheduling downlink control information, DCI, message, the scheduling DCI message containing an explicit indication to a user equipment, UE, to switch search space group monitoring to a different search space group; and transmitting (1304) the DCI message on a downlink control channel; wherein the UE switches monitoring search space groups in response to the explicit indication in the scheduling DCI message.

Example 22. The method of Example 21, wherein the scheduling DCI message comprises a DCI message having DCI format 0-0, 1-0, 0-1, 1-1, 0-2, or 1-2.

Example 23. The method of Example 21 or 22, wherein the scheduling DCI message includes a dedicated bit field that carries the explicit indication.

Example 24. The method of Example 23, wherein the dedicated bit field comprises a value that is mapped to a particular search space group of a plurality of search space groups.

Example 25. The method of any of Examples 21 to 24, wherein the UE is configured switch search space groups in response to the explicit indication following a predetermined delay.

Example 26. The method of Example 21, wherein the explicit indication comprises an invalid value in a field of the DCI message.

Example 27. The method of any of Examples 21 to 26, wherein a timer is associated to the explicit indication such that the UE will switch monitoring search space groups upon expiration of the timer unless a further scheduling DCI is received by the UE.

Example 28. The method of Example 21, wherein the DCI message comprises a DCI format 2-6 message including a wakeup signal, wherein the explicit indication is carried after a UE specific wake-up bit and before an SCell dormancy indication.

Additions to the Implicit Mechanism

Example 31. A method of operating a network node in a communication system, comprising: configuring (1402) a user equipment, UE, for implicit search space group switching; generating (1404) a downlink control information, DCI, message, the DCI message containing an explicit indication to a user equipment, UE; and transmitting (1406) the DCI message to the UE; wherein the UE is configured to switch search space groups in response to the explicit indication.

Example 32. The method of Example 31, wherein a DCI format of the DCI message is associated with a specific search space group; wherein the UE is configured to start monitoring the specific search space group associated with the DCI format of DCI message.

Example 33. The method of Example 31, wherein a scrambling code used to scramble the DCI message is associated with a specific search space group; wherein the UE is configured to start monitoring the specific search space group associated with the scrambling code used to scramble the DCI message.

Example 34. The method of Example 33, wherein the scrambling code comprises a radio network temporary identifier, RNTI.

SS Switch Triggered by UL Request

Example 35. A method of operating a network node in a communication system, comprising: receiving (1502) an uplink transmission from a user equipment, UE, that is monitoring a first search space group; and transmitting (1504) a downlink control information, DCI, message, to the UE on a second search space group to which the UE switched implicitly after transmitting the uplink transmission.

Example 36. The method of Example 35, wherein the second search space is selected based on a DCI format of the DCI message.

SS Switching Behavior when BWP Switch Indicated in Scheduling DCI

Example 37. A method of operating a network node in a communication system, comprising: configuring (1602) multiple bandwidth parts, BWPs, to share a single set of search space group definitions.

Example 38. The method of Example 37, further comprising:

receiving (1604) an indication from the communication system as to which search space group should be used after a change in BWP.

Example 39. The method of Example 37, wherein a default search space group is defined for each BWP.

Joint SS Switching and Cross-Slot Scheduling

Example 40. The method of any previous Example, wherein the UE is configured with a minimum scheduling offset for cross-slot scheduling.

Example 41. The method of any previous Example, wherein, when a DCI is received by the UE that includes an explicit indication to switch search space groups, the DCI further includes an indication of cross slot scheduling mode.

Example 42. The method of any previous Example, wherein, when the UE receives an implicit indication to switch search space groups, the UE implicitly changes cross slot scheduling mode.

Example 43. A network node (500) configured to perform operations of any of Examples 1 to 42.

Example 44. A network node (500) comprising: a processing circuit (503); and a memory circuit (505) coupled to the processing circuit, wherein the memory circuit comprises computer readable program instructions that, when executed by the processing circuit, cause the network node to perform operations according to any of Examples 1 to 42.

UE Specific SS Group Definition and SS Switch Signaling

Example 45. A method of operating a user equipment, UE, in a communication system, comprising: receiving (1602) a downlink control information, DCI, message on a downlink control channel, wherein the DCI message is scrambled using an identifier that is associated with a specific UE that is configured to monitor the first search space group; and switching (1604) to monitoring from a first search space group to a second search space group in response to successfully decoding the DCI message.

Example 46. The method of Example 45, wherein the identifier comprises a C-RNTI.

Example 47. The method of Example 45 or 46, wherein the DCI message comprises a non-scheduling DCI message.

Example 48. The method of any of Examples 45 to 47, wherein the DCI message has a scheduling format.

Example 49. The method of Example 48 wherein the DCI message is a dummy scheduling DCI message that does not contain scheduling information.

Example 50. A method of operating a user equipment, UE, in a communication system, comprising: receiving (1802) a downlink control information, DCI, message on a downlink control channel, wherein the DCI message is scrambled using an identifier that is associated with a plurality of user equipments, UEs, that are configured to monitor the first search space group; and switching (1804) from monitoring a first search space group to monitoring a second search space group in response to successfully decoding the DCI message, and wherein the DCI message comprises an indication of one or more UEs of the plurality of UEs to which the DCI message applies.

Example 51. The method of Example 50, wherein the indication comprises one or more bits in the DCI message.

Example 52. The method of Example 50, wherein the indication comprises a time/frequency location at which the DCI message is located in the search space.

Example 53. A method of operating a user equipment, UE, in a communication system, comprising: receiving (1902) a first downlink control information, DCI, message on a downlink control channel at a first time/frequency location; and receiving (1904) a second downlink control information, DCI, message on the downlink control channel at a second time/frequency location; wherein the first and second DCI messages are scrambled using an identifier that is associated with a plurality of user equipments, UEs, that are configured to monitor a first search space group; and switching (1906) to monitoring a second search space group in response to successfully decoding the first or second DCI message.

Example 54. The method of Example 53, wherein the first DCI message and/or the second DCI message are transmitted within a search space that is not included in the first search space group.

Example 55. The method of Example 53, wherein the first DCI message and/or the second DCI message are transmitted within a search space that is included in the first search space group.

Example 56. The method of Example 53, wherein the identifier comprises a SFI-RNTI.

Switching Among More than 2 SS Groups

Example 57. A method of operating a user equipment, UE, in a communication system, comprising: receiving (2002) a message from a network node configuring the UE with more than two search space groups; and receiving (2004) a downlink control information, DCI, message on a downlink control channel; wherein the DCI message includes an indication of which of the more than two search space groups the UE is to start monitoring in response to receiving the DCI message.

Example 58. The method of Example 57, wherein the UE stops monitoring a first search space group in response to the DCI message.

Example 59. The method of Example 57 or 58, wherein the DCI message is transmitted within a search space that is not included in a first search space group that includes the first search space.

Example 60. The method of Example 57 or 58, wherein the DCI message is transmitted within a search space that is included in a first search space group that includes the first search space.

Example 61. The method of any of Examples 57 to 60, wherein the UE is configured to start monitoring a first one of the more than two search space groups in response to the DCI message and to stop monitoring the first one of the more than two search space groups and start monitoring a second one of the more than two search space groups upon expiration of a timer.

Example 62. The method of any of Examples 57 to 60, wherein the UE is configured to start monitoring a first one of the more than two search space groups in response to the DCI message and to stop monitoring the first one of the more than two search space groups and start monitoring a second one of the more than two search space groups upon receipt of a further DCI message while monitoring the first one of the more than two search space groups.

Example 63. The method of Example 62, wherein the further DCI message includes an indication of the second one of the more than two search space groups.

Example 64. The method of any of Examples 57 to 60, wherein the UE is configured to start monitoring a first one of the more than two search space groups in response to the DCI message and to stop monitoring the first one of the more than two search space groups and start monitoring a second one of the more than two search space groups upon receipt of a further DCI message or expiration of a timer while monitoring the first one of the more than two search space groups.

Example 65. The method of any of Examples 57 to 60, wherein the UE is configured to start monitoring a first one of the more than two search space groups in response to the DCI message, to stop monitoring the first one of the more than two search space groups and start monitoring a second one of the more than two search space groups upon expiration of a timer, and to reset the timer and continue monitoring the first one of the more than two search space groups upon reception of a DCI message while monitoring the first one of the more than two search space groups.

Explicit SS Switching Signaling Embedded in DCI Formats Other than 2-0

Example 66. A method of operating a user equipment, UE, in a communication system, comprising: receiving (2102) a scheduling downlink control information, DCI, message, on a downlink control channel, the scheduling DCI message containing an explicit indication to the UE to switch search space group monitoring to a different search space group; and switching (2104) monitoring search space groups in response to the explicit indication in the scheduling DCI message.

Example 67. The method of Example 66, wherein the scheduling DCI message comprises a DCI message having DCI format 0-0, 1-0, 0-1, 1-1, 0-2, or 1-2.

Example 68. The method of Example 66 or 67, wherein the scheduling DCI message includes a dedicated bit field that carries the explicit indication.

Example 69. The method of Example 68, wherein the dedicated bit field comprises a value that is mapped to a particular search space group of a plurality of search space groups.

Example 70. The method of any of Examples 66 to 69, wherein the UE is configured switch search space groups in response to the explicit indication following a predetermined delay.

Example 71. The method of Example 70, wherein the explicit indication comprises an invalid value in a field of the DCI message.

Example 72. The method of any of Examples 66 to 71, wherein a timer is associated to the explicit indication such that the UE will switch monitoring search space groups upon expiration of the timer unless a further scheduling DCI is received by the UE.

Example 73. The method of Example 72, wherein the DCI message comprises a DCI format 2-6 message including a wakeup signal, wherein the explicit indication is carried after a UE specific wake-up bit and before an SCell dormancy indication.

Additions to the Implicit Mechanism

Example 74. A method of operating a user equipment, UE, in a communication system, comprising: receiving (2202) a message from a network node configuring the user equipment, UE, for implicit search space group switching; and receiving (2204) a downlink control information, DCI, message, the DCI message containing an explicit indication to the UE; wherein the UE is configured to switch search space groups in response to the explicit indication.

Example 75. The method of Example 74, wherein a DCI format of the DCI message is associated with a specific search space group; wherein the UE is configured to start monitoring the specific search space group associated with the DCI format of DCI message.

Example 76. The method of Example 74, wherein a scrambling code used to scramble the DCI message is associated with a specific search space group; wherein the UE is configured to start monitoring the specific search space group associated with the scrambling code used to scramble the DCI message.

Example 77. The method of Example 76, wherein the scrambling code comprises a radio network temporary identifier, RNTI.

SS Switch Triggered by UL Request

Example 78. A method of operating a user equipment, UE, in a communication system, comprising: transmitting (2302) an uplink transmission while monitoring a first search space group; and switching (2304) implicitly after transmitting the uplink transmission to monitoring a second search space group.

Example 79. The method of Example 78, wherein the second search space is selected based on a DCI format of a DCI message that is triggered in response to the uplink transmission.

SS Switching Behavior when BWP Switch Indicated in Scheduling DCI

Example 80. A method of operating a user equipment, UE, in a communication system, comprising: receiving (2402) a message from a network node configuring multiple bandwidth parts, BWPs, to share a single set of search space group definitions.

Example 81. The method of Example 80, further comprising: receiving (2404) an indication from the communication system as to which search space group should be used after a change in BWP.

Example 82. The method of Example 80, wherein a default search space group is defined for each BWP.

Joint SS Switching and Cross-Slot Scheduling

Example 83. The method of any previous Example, wherein the UE is configured with a minimum scheduling offset for cross-slot scheduling.

Example 84. The method of any previous Example, wherein, when a DCI is received by the UE that includes an explicit indication to switch search space groups, the DCI further includes an indication of cross slot scheduling mode.

Example 86. The method of any previous Example, wherein, when the UE receives an implicit indication to switch search space groups, the UE implicitly changes cross slot scheduling mode.

Example 87. A user equipment, UE, (600) configured to perform operations of any of Examples 45 to 86.

Example 88. A user equipment, UE, (600) comprising: a processing circuit (603); and a memory circuit (605) coupled to the processing circuit, wherein the memory circuit comprises computer readable program instructions that, when executed by the processing circuit, cause the UE to perform operations according to any of Examples 45 to 86.

Explanations are provided below for abbreviations that are mentioned in the present disclosure.

| Abbreviation | Explanation |
| --- | --- |
| AMF | Access and Mobility Function |
| BWP | Bandwidth Part |
| CN | Core Network |
| C-RNTI | Cell RNTI |
| DCI | Downlink Control Information |
| DL | Downlink |

-continued

| Abbreviation | Explanation |
| --- | --- |
| DRX | Discontinuous Reception |
| eMBB | Enhanced Mobile Broadband |
| eNB | eNodeB |
| EPC | Evolved Packet Core |
| E-UTRAN | Evolved Universal Terrestrial Radio Access Network |
| gNB | gNodeB |
| GTS | Go-to-Sleep |
| IE | Information Element |
| MCS-RNTI | Modulation Coding Scheme RNTI |
| MME | Mobility Management Entity |
| MO | Monitoring Occasion |
| NW | Network |
| PDCCH | Physical Downlink Control Channel |
| PS | Power Savings |
| PUSCH | Physical Uplink Shared Channel |
| RAN | Radio Access Network |
| RNTI | Radio Network Temporary Identifier |
| SFI-RNTI | Slot Format Indicator RNTI |
| SGW | Serving Gateway |
| SMF | Session Management Function |
| SS | Search Space |
| UE | User Equipment |
| UL | Uplink |
| UPF | User Plane Function |
| WUS | Wake-up Signal |

Further definitions and example embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processing circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description. Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 25:
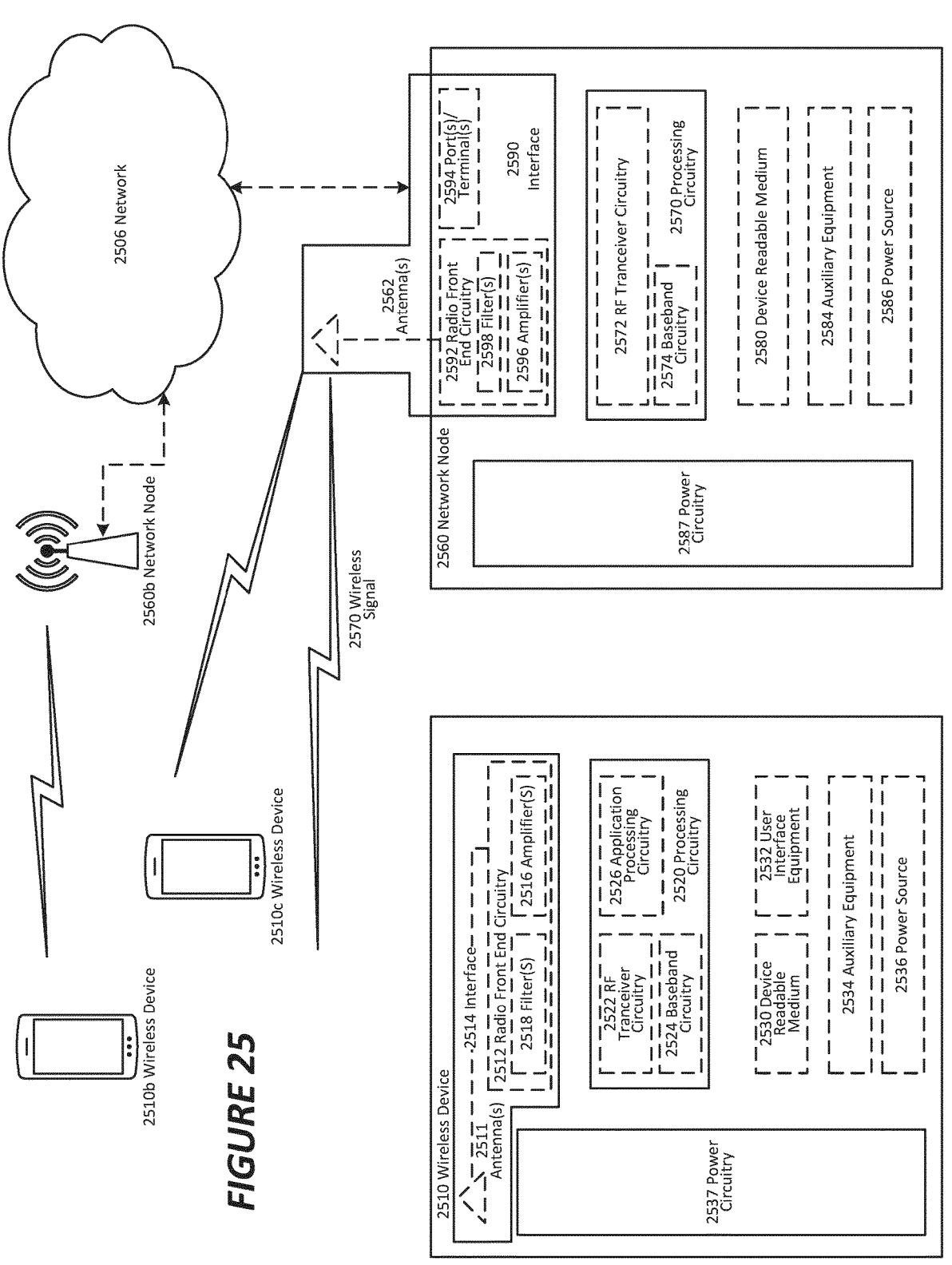
FIG. 25 is a block diagram of a wireless network in accordance with some embodiments.

FIG. 25: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 2506, network nodes 2560 and 2560b, and WDs 2510, 2510b, and 2510c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 2560 and wireless device (WD) 2510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2560 and WD 2510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SM LCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 2560 includes processing circuitry 2570, device readable medium 2580, interface 2590, auxiliary equipment 2584, power source 2586, power circuitry 2587, and antenna 2562. Although network node 2560 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2560 are depicted as single boxes located within a larger box, or nested within multiple boxes, in practice, a network node may comprise multiple different physical components that make up a single illustrated component (e.g., device readable medium 2580 may comprise multiple separate hard drives as well as multiple RAM modules).

Similarly, network node 2560 may be composed of multiple physically separate components (e.g., a NodeB component and a RNC component, or a BTS component and a BSC component, etc.), which may each have their own respective components. In certain scenarios in which network node 2560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2560 may be configured to support multiple radio access technologies (RATs). In such embodiments, some components may be duplicated (e.g., separate device readable medium 2580 for the different RATs) and some components may be reused (e.g., the same antenna 2562 may be shared by the RATs). Network node 2560 may also include multiple sets of the various illustrated components for different wireless technologies integrated into network node 2560, such as, for example, GSM, WCDMA, LTE, NR, WiFi, or Bluetooth wireless technologies. These wireless technologies may be integrated into the same or different chip or set of chips and other components within network node 2560.

Processing circuitry 2570 is configured to perform any determining, calculating, or similar operations (e.g., certain obtaining operations) described herein as being provided by a network node. These operations performed by processing circuitry 2570 may include processing information obtained by processing circuitry 2570 by, for example, converting the obtained information into other information, comparing the obtained information or converted information to information stored in the network node, and/or performing one or more operations based on the obtained information or converted information, and as a result of said processing making a determination.

Processing circuitry 2570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2560 components, such as device readable medium 2580, network node 2560 functionality. For example, processing circuitry 2570 may execute instructions stored in device readable medium 2580 or in memory within processing circuitry 2570. Such functionality may include providing any of the various wireless features, functions, or benefits discussed herein. In some embodiments, processing circuitry 2570 may include a system on a chip (SOC).

In some embodiments, processing circuitry 2570 may include one or more of radio frequency (RF) transceiver circuitry 2572 and baseband processing circuitry 2574. In some embodiments, radio frequency (RF) transceiver circuitry 2572 and baseband processing circuitry 2574 may be on separate chips (or sets of chips), boards, or units, such as radio units and digital units. In alternative embodiments, part or all of RF transceiver circuitry 2572 and baseband processing circuitry 2574 may be on the same chip or set of chips, boards, or units.

In certain embodiments, some or all of the functionality described herein as being provided by a network node, base station, eNB or other such network device may be performed by processing circuitry 2570 executing instructions stored on device readable medium 2580 or memory within processing circuitry 2570. In alternative embodiments, some or all of the functionality may be provided by processing circuitry 2570 without executing instructions stored on a separate or discrete device readable medium, such as in a hard-wired manner. In any of those embodiments, whether executing instructions stored on a device readable storage medium or not, processing circuitry 2570 can be configured to perform the described functionality. The benefits provided by such functionality are not limited to processing circuitry 2570 alone or to other components of network node 2560, but are enjoyed by network node 2560 as a whole, and/or by end users and the wireless network generally.

Device readable medium 2580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2570. Device readable medium 2580 may store any suitable instructions, data or information, including a computer program, software, an application including one or more of logic, rules, code, tables, etc. and/or other instructions capable of being executed by processing circuitry 2570 and, utilized by network node 2560. Device readable medium 2580 may be used to store any calculations made by processing circuitry 2570 and/or any data received via interface 2590. In some embodiments, processing circuitry 2570 and device readable medium 2580 may be considered to be integrated.

Interface 2590 is used in the wired or wireless communication of signalling and/or data between network node 2560, network 2506, and/or WDs 2510. As illustrated, interface 2590 comprises port(s)/terminal(s) 2594 to send and receive data, for example to and from network 2506 over a wired connection. Interface 2590 also includes radio front end circuitry 2592 that may be coupled to, or in certain embodiments a part of, antenna 2562. Radio front end circuitry 2592 comprises filters 2598 and amplifiers 2596. Radio front end circuitry 2592 may be connected to antenna 2562 and processing circuitry 2570. Radio front end circuitry may be configured to condition signals communicated between antenna 2562 and processing circuitry 2570. Radio front end circuitry 2592 may receive digital data that is to be sent out to other network nodes or WDs via a wireless connection. Radio front end circuitry 2592 may convert the digital data into a radio signal having the appropriate channel and bandwidth parameters using a combination of filters 2598 and/or amplifiers 2596. The radio signal may then be transmitted via antenna 2562. Similarly, when receiving data, antenna 2562 may collect radio signals which are then converted into digital data by radio front end circuitry 2592. The digital data may be passed to processing circuitry 2570. In other embodiments, the interface may comprise different components and/or different combinations of components.

In certain alternative embodiments, network node 2560 may not include separate radio front end circuitry 2592, instead, processing circuitry 2570 may comprise radio front end circuitry and may be connected to antenna 2562 without separate radio front end circuitry 2592. Similarly, in some embodiments, all or some of RF transceiver circuitry 2572 may be considered a part of interface 2590. In still other embodiments, interface 2590 may include one or more ports or terminals 2594, radio front end circuitry 2592, and RF transceiver circuitry 2572, as part of a radio unit (not shown), and interface 2590 may communicate with baseband processing circuitry 2574, which is part of a digital unit (not shown).

Antenna 2562 may include one or more antennas, or antenna arrays, configured to send and/or receive wireless signals. Antenna 2562 may be coupled to radio front end circuitry 2592 and may be any type of antenna capable of transmitting and receiving data and/or signals wirelessly. In some embodiments, antenna 2562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2562 may be separate from network node 2560 and may be connectable to network node 2560 through an interface or port.

Antenna 2562, interface 2590, and/or processing circuitry 2570 may be configured to perform any receiving operations and/or certain obtaining operations described herein as being performed by a network node. Any information, data and/or signals may be received from a wireless device, another network node and/or any other network equipment. Similarly, antenna 2562, interface 2590, and/or processing circuitry 2570 may be configured to perform any transmitting operations described herein as being performed by a network node. Any information, data and/or signals may be transmitted to a wireless device, another network node and/or any other network equipment.

Power circuitry 2587 may comprise, or be coupled to, power management circuitry and is configured to supply the components of network node 2560 with power for performing the functionality described herein. Power circuitry 2587 may receive power from power source 2586. Power source 2586 and/or power circuitry 2587 may be configured to provide power to the various components of network node 2560 in a form suitable for the respective components (e.g., at a voltage and current level needed for each respective component). Power source 2586 may either be included in, or external to, power circuitry 2587 and/or network node 2560. For example, network node 2560 may be connectable to an external power source (e.g., an electricity outlet) via an input circuitry or interface such as an electrical cable, whereby the external power source supplies power to power circuitry 2587. As a further example, power source 2586 may comprise a source of power in the form of a battery or battery pack which is connected to, or integrated in, power circuitry 2587. The battery may provide backup power should the external power source fail. Other types of power sources, such as photovoltaic devices, may also be used.

Alternative embodiments of network node 2560 may include additional components beyond those shown in FIG. 25 that may be responsible for providing certain aspects of the network node's functionality, including any of the functionality described herein and/or any functionality necessary to support the subject matter described herein. For example, network node 2560 may include user interface equipment to allow input of information into network node 2560 and to allow output of information from network node 2560. This may allow a user to perform diagnostic, maintenance, repair, and other administrative functions for network node 2560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2510 includes antenna 2511, interface 2514, processing circuitry 2520, device readable medium 2530, user interface equipment 2532, auxiliary equipment 2534, power source 2536 and power circuitry 2537. WD 2510 may include multiple sets of one or more of the illustrated components for different wireless technologies supported by WD 2510, such as, for example, GSM, WCDMA, LTE, NR, WiFi, WiMAX, or Bluetooth wireless technologies, just to mention a few. These wireless technologies may be integrated into the same or different chips or set of chips as other components within WD 2510.

Antenna 2511 may include one or more antennas or antenna arrays, configured to send and/or receive wireless signals, and is connected to interface 2514. In certain alternative embodiments, antenna 2511 may be separate from WD 2510 and be connectable to WD 2510 through an interface or port. Antenna 2511, interface 2514, and/or processing circuitry 2520 may be configured to perform any receiving or transmitting operations described herein as being performed by a WD. Any information, data and/or signals may be received from a network node and/or another WD. In some embodiments, radio front end circuitry and/or antenna 2511 may be considered an interface.

As illustrated, interface 2514 comprises radio front end circuitry 2512 and antenna 2511. Radio front end circuitry 2512 comprise one or more filters 2518 and amplifiers 2516. Radio front end circuitry 2512 is connected to antenna 2511 and processing circuitry 2520, and is configured to condition signals communicated between antenna 2511 and processing circuitry 2520. Radio front end circuitry 2512 may be coupled to or a part of antenna 2511. In some embodiments, WD 2510 may not include separate radio front end circuitry 2512; rather, processing circuitry 2520 may comprise radio front end circuitry and may be connected to antenna 2511. Similarly, in some embodiments, some or all of RF transceiver circuitry 2522 may be considered a part of interface 2514. Radio front end circuitry 2512 may receive digital data that is to be sent out to other network nodes or WDs via a wireless connection. Radio front end circuitry 2512 may convert the digital data into a radio signal having the appropriate channel and bandwidth parameters using a combination of filters 2518 and/or amplifiers 2516. The radio signal may then be transmitted via antenna 2511. Similarly, when receiving data, antenna 2511 may collect radio signals which are then converted into digital data by radio front end circuitry 2512. The digital data may be passed to processing circuitry 2520. In other embodiments, the interface may comprise different components and/or different combinations of components.

Processing circuitry 2520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2510 components, such as device readable medium 2530, WD 2510 functionality. Such functionality may include providing any of the various wireless features or benefits discussed herein. For example, processing circuitry 2520 may execute instructions stored in device readable medium 2530 or in memory within processing circuitry 2520 to provide the functionality disclosed herein.

As illustrated, processing circuitry 2520 includes one or more of RF transceiver circuitry 2522, baseband processing circuitry 2524, and application processing circuitry 2526. In other embodiments, the processing circuitry may comprise different components and/or different combinations of components. In certain embodiments processing circuitry 2520 of WD 2510 may comprise a SOC. In some embodiments, RF transceiver circuitry 2522, baseband processing circuitry 2524, and application processing circuitry 2526 may be on separate chips or sets of chips. In alternative embodiments, part or all of baseband processing circuitry 2524 and application processing circuitry 2526 may be combined into one chip or set of chips, and RF transceiver circuitry 2522 may be on a separate chip or set of chips. In still alternative embodiments, part or all of RF transceiver circuitry 2522 and baseband processing circuitry 2524 may be on the same chip or set of chips, and application processing circuitry 2526 may be on a separate chip or set of chips. In yet other alternative embodiments, part or all of RF transceiver circuitry 2522, baseband processing circuitry 2524, and application processing circuitry 2526 may be combined in the same chip or set of chips. In some embodiments, RF transceiver circuitry 2522 may be a part of interface 2514. RF transceiver circuitry 2522 may condition RF signals for processing circuitry 2520.

In certain embodiments, some or all of the functionality described herein as being performed by a WD may be provided by processing circuitry 2520 executing instructions stored on device readable medium 2530, which in certain embodiments may be a computer-readable storage medium. In alternative embodiments, some or all of the functionality may be provided by processing circuitry 2520 without executing instructions stored on a separate or discrete device readable storage medium, such as in a hard-wired manner. In any of those particular embodiments, whether executing instructions stored on a device readable storage medium or not, processing circuitry 2520 can be configured to perform the described functionality. The benefits provided by such functionality are not limited to processing circuitry 2520 alone or to other components of WD 2510, but are enjoyed by WD 2510 as a whole, and/or by end users and the wireless network generally.

Processing circuitry 2520 may be configured to perform any determining, calculating, or similar operations (e.g., certain obtaining operations) described herein as being performed by a WD. These operations, as performed by processing circuitry 2520, may include processing information obtained by processing circuitry 2520 by, for example, converting the obtained information into other information, comparing the obtained information or converted information to information stored by WD 2510, and/or performing one or more operations based on the obtained information or converted information, and as a result of said processing making a determination.

Device readable medium 2530 may be operable to store a computer program, software, an application including one or more of logic, rules, code, tables, etc. and/or other instructions capable of being executed by processing circuitry 2520. Device readable medium 2530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2520. In some embodiments, processing circuitry 2520 and device readable medium 2530 may be considered to be integrated.

User interface equipment 2532 may provide components that allow for a human user to interact with WD 2510. Such interaction may be of many forms, such as visual, audial, tactile, etc. User interface equipment 2532 may be operable to produce output to the user and to allow the user to provide input to WD 2510. The type of interaction may vary depending on the type of user interface equipment 2532 installed in WD 2510. For example, if WD 2510 is a smart phone, the interaction may be via a touch screen; if WD 2510 is a smart meter, the interaction may be through a screen that provides usage (e.g., the number of gallons used) or a speaker that provides an audible alert (e.g., if smoke is detected). User interface equipment 2532 may include input interfaces, devices and circuits, and output interfaces, devices and circuits. User interface equipment 2532 is configured to allow input of information into WD 2510, and is connected to processing circuitry 2520 to allow processing circuitry 2520 to process the input information. User interface equipment 2532 may include, for example, a microphone, a proximity or other sensor, keys/buttons, a touch display, one or more cameras, a USB port, or other input circuitry. User interface equipment 2532 is also configured to allow output of information from WD 2510, and to allow processing circuitry 2520 to output information from WD 2510. User interface equipment 2532 may include, for example, a speaker, a display, vibrating circuitry, a USB port, a headphone interface, or other output circuitry. Using one or more input and output interfaces, devices, and circuits, of user interface equipment 2532, WD 2510 may communicate with end users and/or the wireless network, and allow them to benefit from the functionality described herein.

Auxiliary equipment 2534 is operable to provide more specific functionality which may not be generally performed by WDs. This may comprise specialized sensors for doing measurements for various purposes, interfaces for additional types of communication such as wired communications etc. The inclusion and type of components of auxiliary equipment 2534 may vary depending on the embodiment and/or scenario.

Power source 2536 may, in some embodiments, be in the form of a battery or battery pack. Other types of power sources, such as an external power source (e.g., an electricity outlet), photovoltaic devices or power cells, may also be used. WD 2510 may further comprise power circuitry 2537 for delivering power from power source 2536 to the various parts of WD 2510 which need power from power source 2536 to carry out any functionality described or indicated herein. Power circuitry 2537 may in certain embodiments comprise power management circuitry. Power circuitry 2537 may additionally or alternatively be operable to receive power from an external power source; in which case WD 2510 may be connectable to the external power source (such as an electricity outlet) via input circuitry or an interface such as an electrical power cable. Power circuitry 2537 may also in certain embodiments be operable to deliver power from an external power source to power source 2536. This may be, for example, for the charging of power source 2536. Power circuitry 2537 may perform any formatting, converting, or other modification to the power from power source 2536 to make the power suitable for the respective components of WD 2510 to which power is supplied.

Figure 26:
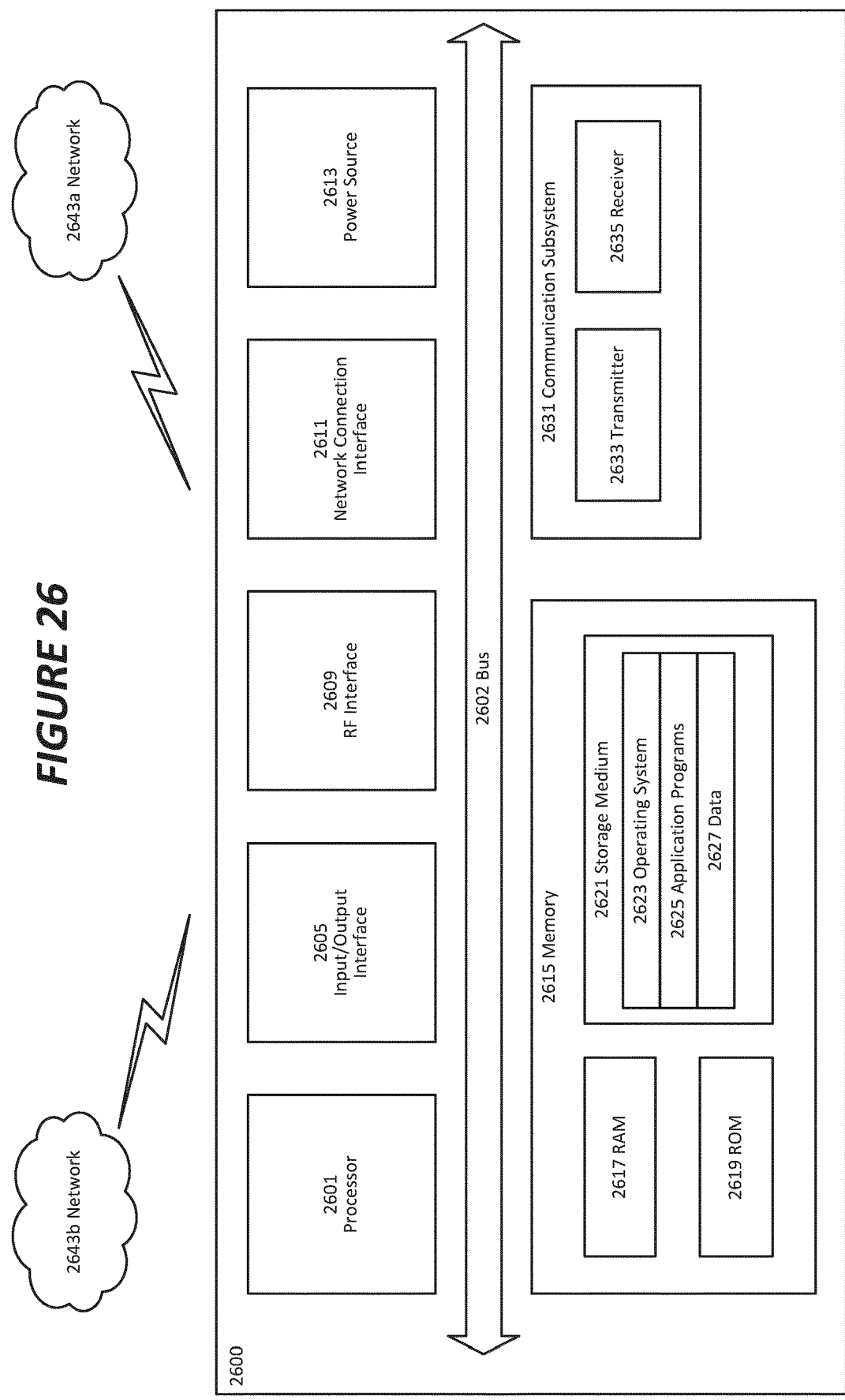
FIG. 26 is a block diagram of a user equipment in accordance with some embodiments

FIG. 26: User Equipment in accordance with some embodiments

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 26200 may be any UE identified by the 3rd Generation Partnership Project (3GPP), including a NB-IoT UE, a machine type communication (MTC) UE, and/or an enhanced MTC (eMTC) UE. UE 2600, as illustrated in FIG. 26, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 26 is a UE, the components discussed herein are equally applicable to a WD, and vice-versa.

In FIG. 26, UE 2600 includes processing circuitry 2601 that is operatively coupled to input/output interface 2605, radio frequency (RF) interface 2609, network connection interface 2611, memory 2615 including random access memory (RAM) 2617, read-only memory (ROM) 2619, and storage medium 2621 or the like, communication subsystem 2631, power source 2613, and/or any other component, or any combination thereof. Storage medium 2621 includes operating system 2623, application program 2625, and data 2627. In other embodiments, storage medium 2621 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 2601 may be configured to process computer instructions and data. Processing circuitry 2601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2601 may include two central processing units (CPUs). Data may be information in a form suitable for use by a computer.

In the depicted embodiment, input/output interface 2605 may be configured to provide a communication interface to an input device, output device, or input and output device. UE 2600 may be configured to use an output device via input/output interface 2605. An output device may use the same type of interface port as an input device. For example, a USB port may be used to provide input to and output from UE 2600. The output device may be a speaker, a sound card, a video card, a display, a monitor, a printer, an actuator, an emitter, a smartcard, another output device, or any combination thereof. UE 2600 may be configured to use an input device via input/output interface 2605 to allow a user to capture information into UE 2600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 2609 may be configured to provide a communication interface to RF components such as a transmitter, a receiver, and an antenna. Network connection interface 2611 may be configured to provide a communication interface to network 2643*a*. Network 2643*a* may encompass wired and/or wireless networks such as a local-area network (LAN), a wide-area network (WAN), a computer network, a wireless network, a telecommunications network, another like network or any combination thereof. For example, network 2643*a* may comprise a Wi-Fi network. Network connection interface 2611 may be configured to include a receiver and a transmitter interface used to communicate with one or more other devices over a communication network according to one or more communication protocols, such as Ethernet, TCP/IP, SONET, ATM, or the like. Network connection interface 2611 may implement receiver and transmitter functionality appropriate to the communication network links (e.g., optical, electrical, and the like). The transmitter and receiver functions may share circuit components, software or firmware, or alternatively may be implemented separately.

RAM 2617 may be configured to interface via bus 2602 to processing circuitry 2601 to provide storage or caching of data or computer instructions during the execution of software programs such as the operating system, application programs, and device drivers. ROM 2619 may be configured to provide computer instructions or data to processing circuitry 2601. For example, ROM 2619 may be configured to store invariant low-level system code or data for basic system functions such as basic input and output (I/O), startup, or reception of keystrokes from a keyboard that are stored in a non-volatile memory. Storage medium 2621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2621 may be configured to include operating system 2623, application program 2625 such as a web browser application, a widget or gadget engine or another application, and data file 2627. Storage medium 2621 may store, for use by UE 2600, any of a variety of various operating systems or combinations of operating systems.

Storage medium 2621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2621 may allow UE 2600 to access computer-executable instructions, application programs or the like, stored on transitory or non-transitory memory media, to off-load data, or to upload data. An article of manufacture, such as one utilizing a communication system may be tangibly embodied in storage medium 2621, which may comprise a device readable medium.

In FIG. 26, processing circuitry 2601 may be configured to communicate with network 2643*b* using communication subsystem 2631. Network 2643*a* and network 2643*b* may be the same network or networks or different network or networks. Communication subsystem 2631 may be configured to include one or more transceivers used to communicate with network 2643*b*. For example, communication subsystem 2631 may be configured to include one or more transceivers used to communicate with one or more remote transceivers of another device capable of wireless communication such as another WD, UE, or base station of a radio access network (RAN) according to one or more communication protocols, such as IEEE 802.26, CDMA, WCDMA, GSM, LTE, UTRAN, WiMax, or the like. Each transceiver may include transmitter 2633 and/or receiver 2635 to implement transmitter or receiver functionality, respectively, appropriate to the RAN links (e.g., frequency allocations and the like). Further, transmitter 2633 and receiver 2635 of each transceiver may share circuit components, software or firmware, or alternatively may be implemented separately.

In the illustrated embodiment, the communication functions of communication subsystem 2631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2631 may include cellular communication, Wi-Fi communication, Bluetooth communication, and GPS communication. Network 2643*b* may encompass wired and/or wireless networks such as a local-area network (LAN), a wide-area network (WAN), a computer network, a wireless network, a telecommunications network, another like network or any combination thereof. For example, network 2643*b* may be a cellular network, a Wi-Fi network, and/or a near-field network. Power source 2613 may be configured to provide alternating current (AC) or direct current (DC) power to components of UE 2600.

The features, benefits and/or functions described herein may be implemented in one of the components of UE 2600 or partitioned across multiple components of UE 2600. Further, the features, benefits, and/or functions described herein may be implemented in any combination of hardware, software or firmware. In one example, communication subsystem 2631 may be configured to include any of the components described herein. Further, processing circuitry 2601 may be configured to communicate with any of such components over bus 2602. In another example, any of such components may be represented by program instructions stored in memory that when executed by processing circuitry 2601 perform the corresponding functions described herein. In another example, the functionality of any of such components may be partitioned between processing circuitry 2601 and communication subsystem 2631. In another example, the non-computationally intensive functions of any of such components may be implemented in software or firmware and the computationally intensive functions may be implemented in hardware.

Figure 27:
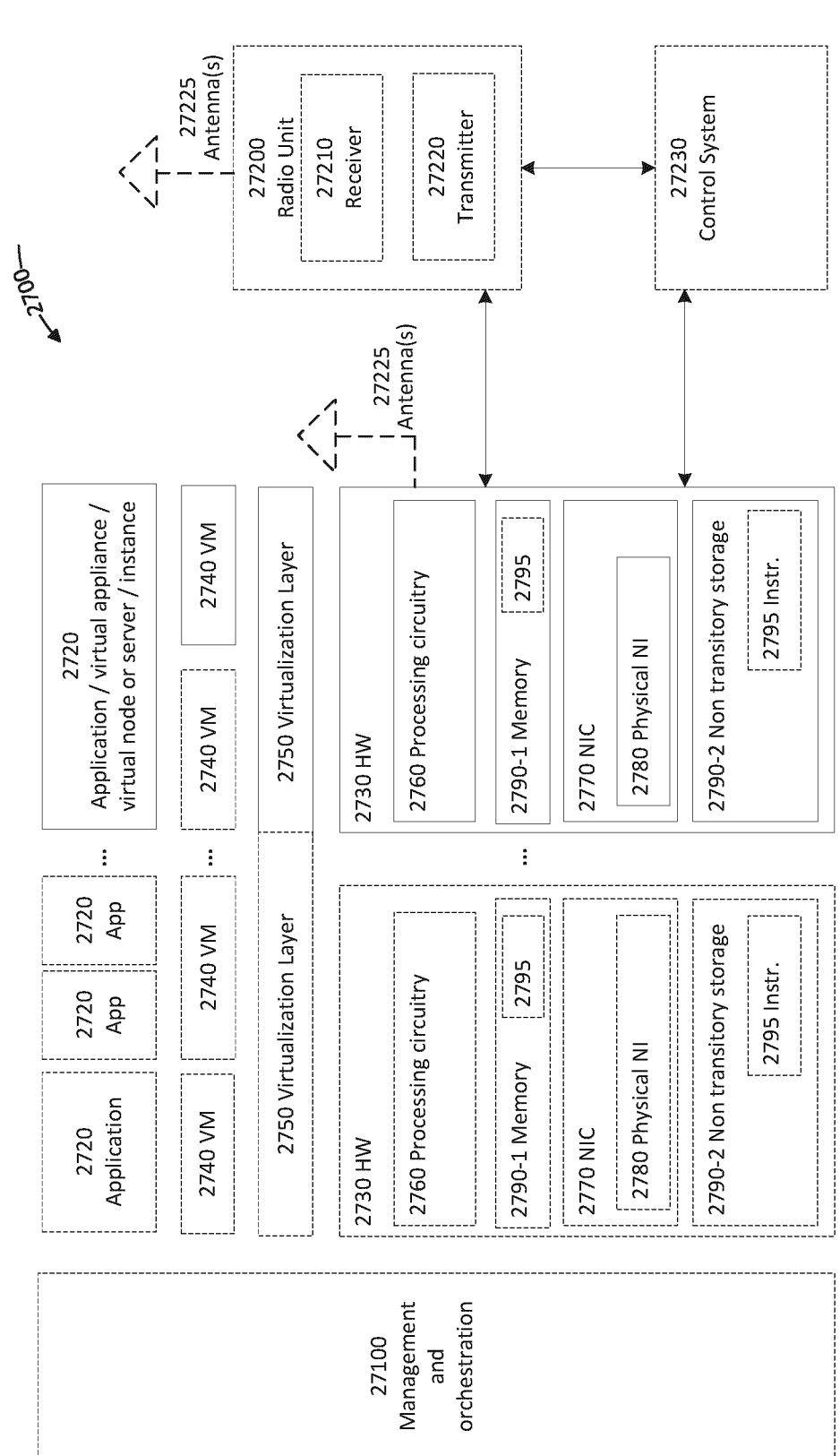
FIG. 27 is a block diagram of a virtualization environment in accordance with some embodiments.

FIG. 27: Virtualization environment in accordance with some embodiments

FIG. 27 is a schematic block diagram illustrating a virtualization environment 2700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2700 hosted by one or more of hardware nodes 2730. Further, in embodiments in which the virtual node is not a radio access node or does not require radio connectivity (e.g., a core network node), then the network node may be entirely virtualized.

The functions may be implemented by one or more applications 2720 (which may alternatively be called software instances, virtual appliances, network functions, virtual nodes, virtual network functions, etc.) operative to implement some of the features, functions, and/or benefits of some of the embodiments disclosed herein. Applications 2720 are run in virtualization environment 2700 which provides hardware 2730 comprising processing circuitry 2760 and memory 2790. Memory 2790 contains instructions 2795 executable by processing circuitry 2760 whereby application 2720 is operative to provide one or more of the features, benefits, and/or functions disclosed herein.

Virtualization environment 2700, comprises general-purpose or special-purpose network hardware devices 2730 comprising a set of one or more processors or processing circuitry 2760, which may be commercial off-the-shelf (COTS) processors, dedicated Application Specific Integrated Circuits (ASICs), or any other type of processing circuitry including digital or analog hardware components or special purpose processors. Each hardware device may comprise memory 2790-1 which may be non-persistent memory for temporarily storing instructions 2795 or software executed by processing circuitry 2760. Each hardware device may comprise one or more network interface controllers (NICs) 2770, also known as network interface cards, which include physical network interface 2780. Each hardware device may also include non-transitory, persistent, machine-readable storage media 2790-2 having stored therein software 2795 and/or instructions executable by processing circuitry 2760. Software 2795 may include any type of software including software for instantiating one or more virtualization layers 2750 (also referred to as hypervisors), software to execute virtual machines 2740 as well as software allowing it to execute functions, features and/or benefits described in relation with some embodiments described herein.

Virtual machines 2740, comprise virtual processing, virtual memory, virtual networking or interface and virtual storage, and may be run by a corresponding virtualization layer 2750 or hypervisor. Different embodiments of the instance of virtual appliance 2720 may be implemented on one or more of virtual machines 2740, and the implementations may be made in different ways.

During operation, processing circuitry 2760 executes software 2795 to instantiate the hypervisor or virtualization layer 2750, which may sometimes be referred to as a virtual machine monitor (VMM). Virtualization layer 2750 may present a virtual operating platform that appears like networking hardware to virtual machine 2740.

As shown in FIG. 27, hardware 2730 may be a standalone network node with generic or specific components. Hardware 2730 may comprise antenna 27225 and may implement some functions via virtualization. Alternatively, hardware 2730 may be part of a larger cluster of hardware (e.g. such as in a data center or customer premise equipment (CPE)) where many hardware nodes work together and are managed via management and orchestration (MANO) 27100, which, among others, oversees lifecycle management of applications 2720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2740 may be a software implementation of a physical machine that runs programs as if they were executing on a physical, non-virtualized machine. Each of virtual machines 2740, and that part of hardware 2730 that executes that virtual machine, be it hardware dedicated to that virtual machine and/or hardware shared by that virtual machine with others of the virtual machines 2740, forms a separate virtual network elements (VNE).

Still in the context of NFV, Virtual Network Function (VNF) is responsible for handling specific network functions that run in one or more virtual machines 2740 on top of hardware networking infrastructure 2730 and corresponds to application 2720 in FIG. 27.

In some embodiments, one or more radio units 27200 that each include one or more transmitters 27220 and one or more receivers 27210 may be coupled to one or more antennas 27225. Radio units 27200 may communicate directly with hardware nodes 2730 via one or more appropriate network interfaces and may be used in combination with the virtual components to provide a virtual node with radio capabilities, such as a radio access node or a base station.

In some embodiments, some signalling can be effected with the use of control system 27230 which may alternatively be used for communication between the hardware nodes 2730 and radio units 27200.

Figure 28:
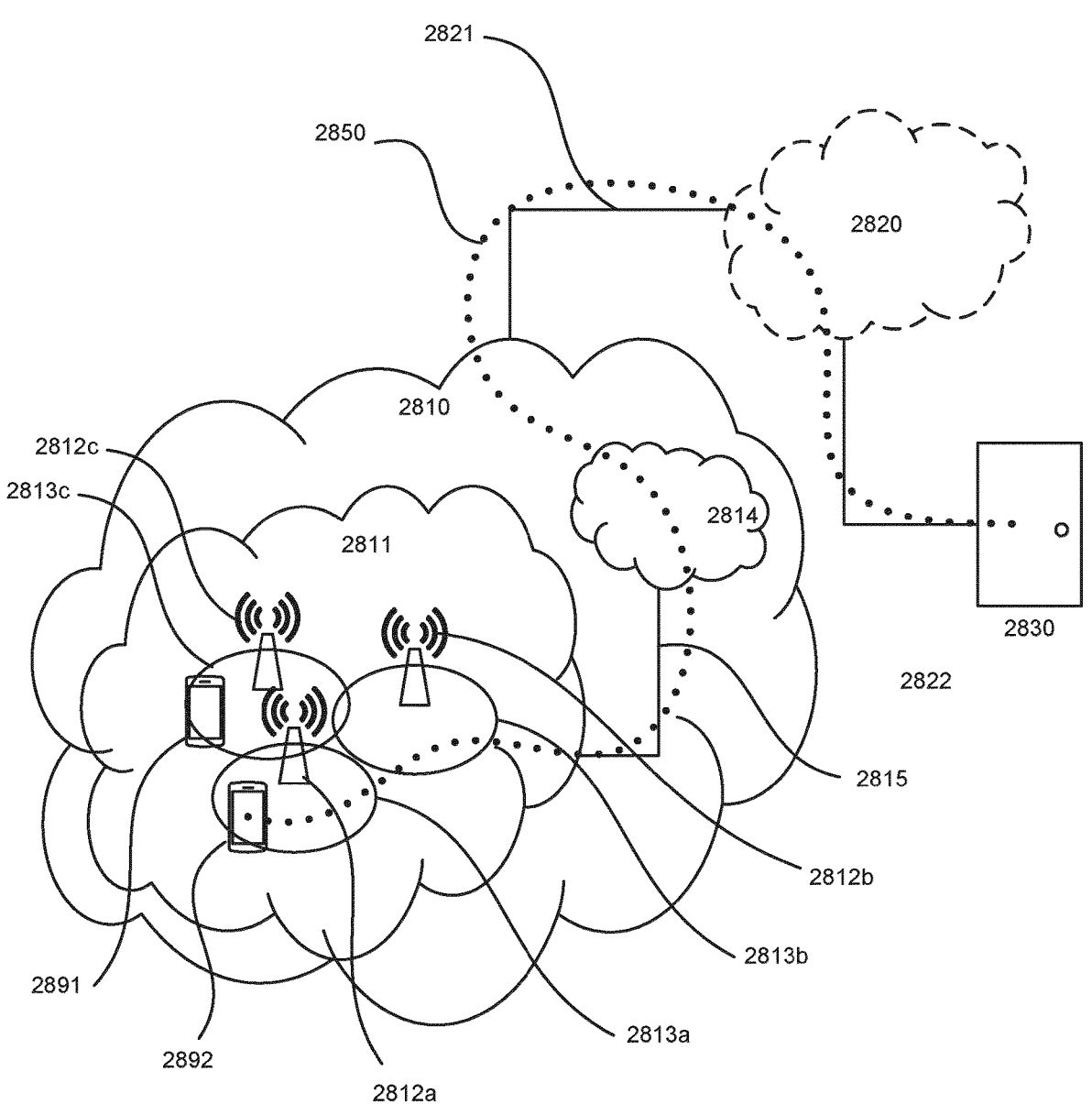
FIG. 28 is a block diagram of a telecommunication network connected via an intermediate network to a host computer in accordance with some embodiments.

FIG. 28: Telecommunication network connected via an intermediate network to a host computer in accordance with some embodiments.

With reference to FIG. 28, in accordance with an embodiment, a communication system includes telecommunication network 2810, such as a 3GPP-type cellular network, which comprises access network 2811, such as a radio access network, and core network 2814. Access network 2811 comprises a plurality of base stations 2812*a*, 2812*b*, 2812*c*, such as NBs, eNBs, gNBs or other types of wireless access points, each defining a corresponding coverage area 2813*a*, 2813*b*, 2813*c*. Each base station 2812*a*, 2812*b*, 2812*c* is connectable to core network 2814 over a wired or wireless connection 2815. A first UE 2891 located in coverage area 2813*c* is configured to wirelessly connect to, or be paged by, the corresponding base station 2812*c*. A second UE 2892 in coverage area 2813*a* is wirelessly connectable to the corresponding base station 2812*a*. While a plurality of UEs 2891, 2892 are illustrated in this example, the disclosed embodiments are equally applicable to a situation where a sole UE is in the coverage area or where a sole UE is connecting to the corresponding base station 2812.

Telecommunication network 2810 is itself connected to host computer 2830, which may be embodied in the hardware and/or software of a standalone server, a cloud-implemented server, a distributed server or as processing resources in a server farm. Host computer 2830 may be under the ownership or control of a service provider, or may be operated by the service provider or on behalf of the service provider. Connections 2821 and 2822 between telecommunication network 2810 and host computer 2830 may extend directly from core network 2814 to host computer 2830 or may go via an optional intermediate network 2820. Intermediate network 2820 may be one of, or a combination of more than one of, a public, private or hosted network; intermediate network 2820, if any, may be a backbone network or the Internet; in particular, intermediate network 2820 may comprise two or more sub-networks (not shown).

The communication system of FIG. 28 as a whole enables connectivity between the connected UEs 2891, 2892 and host computer 2830. The connectivity may be described as an over-the-top (OTT) connection 2850. Host computer 2830 and the connected UEs 2891, 2892 are configured to communicate data and/or signaling via OTT connection 2850, using access network 2811, core network 2814, any intermediate network 2820 and possible further infrastructure (not shown) as intermediaries. OTT connection 2850 may be transparent in the sense that the participating communication devices through which OTT connection 2850 passes are unaware of routing of uplink and downlink communications. For example, base station 2812 may not or need not be informed about the past routing of an incoming downlink communication with data originating from host computer 2830 to be forwarded (e.g., handed over) to a connected UE 2891. Similarly, base station 2812 need not be aware of the future routing of an outgoing uplink communication originating from the UE 2891 towards the host computer 2830.

Figure 29:
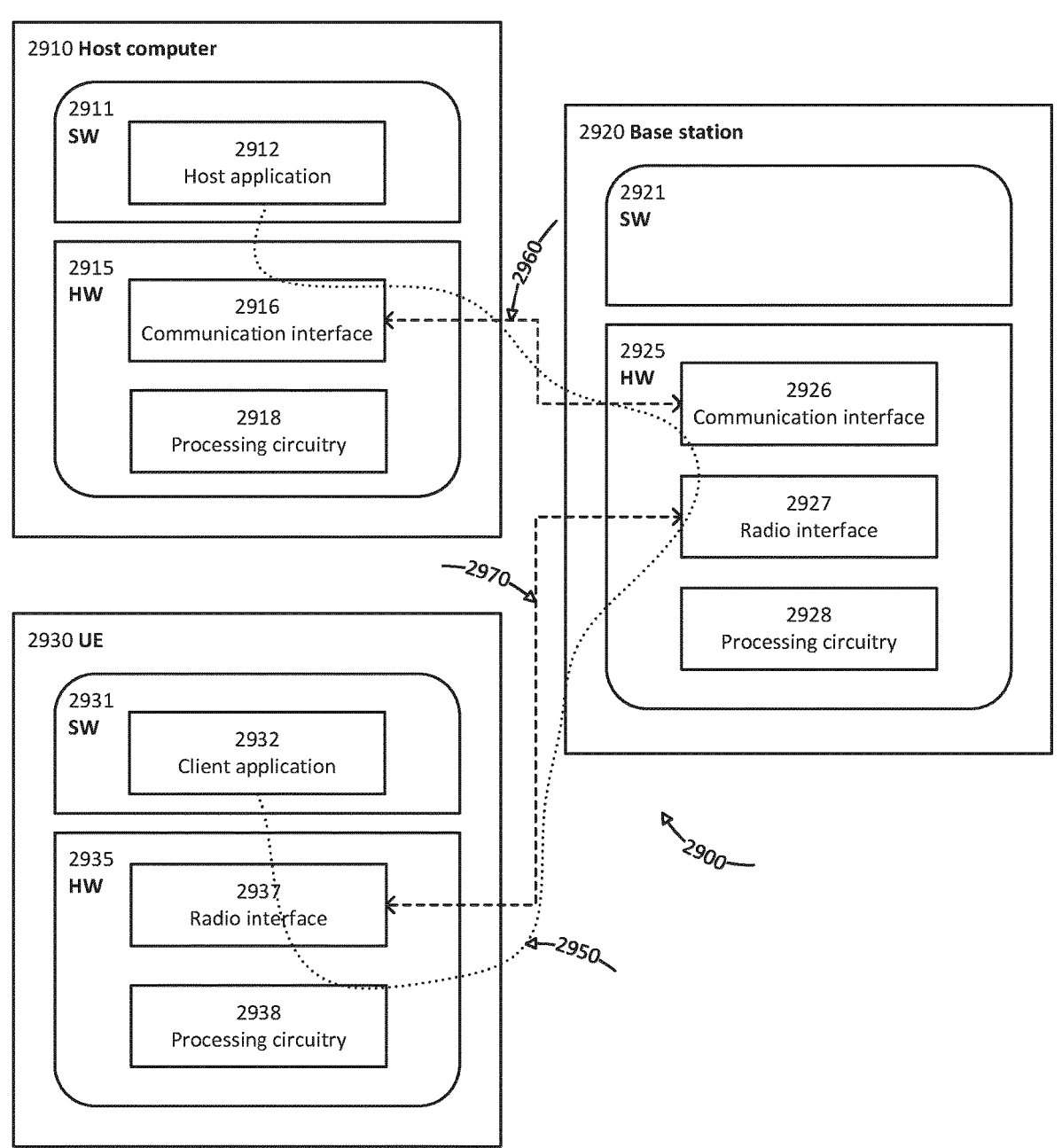
FIG. 29 is a block diagram of a host computer communicating via a base station with a user equipment over a partially wireless connection in accordance with some embodiments.

FIG. 29: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 29. In communication system 2900, host computer 2910 comprises hardware 2915 including communication interface 2916 configured to set up and maintain a wired or wireless connection with an interface of a different communication device of communication system 2900. Host computer 2910 further comprises processing circuitry 2918, which may have storage and/or processing capabilities. In particular, processing circuitry 2918 may comprise one or more programmable processors, application-specific integrated circuits, field programmable gate arrays or combinations of these (not shown) adapted to execute instructions. Host computer 2910 further comprises software 2911, which is stored in or accessible by host computer 2910 and executable by processing circuitry 2918. Software 2911 includes host application 2912. Host application 2912 may be operable to provide a service to a remote user, such as UE 2930 connecting via OTT connection 2950 terminating at UE 2930 and host computer 2910. In providing the service to the remote user, host application 2912 may provide user data which is transmitted using OTT connection 2950.

Communication system 2900 further includes base station 2920 provided in a telecommunication system and comprising hardware 2925 enabling it to communicate with host computer 2910 and with UE 2930. Hardware 2925 may include communication interface 2926 for setting up and maintaining a wired or wireless connection with an interface of a different communication device of communication system 2900, as well as radio interface 2927 for setting up and maintaining at least wireless connection 2970 with UE 2930 located in a coverage area (not shown in FIG. 29) served by base station 2920. Communication interface 2926 may be configured to facilitate connection 2960 to host computer 2910. Connection 2960 may be direct or it may pass through a core network (not shown in FIG. 29) of the telecommunication system and/or through one or more intermediate networks outside the telecommunication system. In the embodiment shown, hardware 2925 of base station 2920 further includes processing circuitry 2928, which may comprise one or more programmable processors, application-specific integrated circuits, field programmable gate arrays or combinations of these (not shown) adapted to execute instructions. Base station 2920 further has software 2921 stored internally or accessible via an external connection.

Communication system 2900 further includes UE 2930 already referred to. Its hardware 2935 may include radio interface 2937 configured to set up and maintain wireless connection 2970 with a base station serving a coverage area in which UE 2930 is currently located. Hardware 2935 of UE 2930 further includes processing circuitry 2938, which may comprise one or more programmable processors, application-specific integrated circuits, field programmable gate arrays or combinations of these (not shown) adapted to execute instructions. UE 2930 further comprises software 2931, which is stored in or accessible by UE 2930 and executable by processing circuitry 2938. Software 2931 includes client application 2932. Client application 2932 may be operable to provide a service to a human or non-human user via UE 2930, with the support of host computer 2910. In host computer 2910, an executing host application 2912 may communicate with the executing client application 2932 via OTT connection 2950 terminating at UE 2930 and host computer 2910. In providing the service to the user, client application 2932 may receive request data from host application 2912 and provide user data in response to the request data. OTT connection 2950 may transfer both the request data and the user data. Client application 2932 may interact with the user to generate the user data that it provides.

It is noted that host computer 2910, base station 2920 and UE 2930 illustrated in FIG. 29 may be similar or identical to host computer 2830, one of base stations 2812a, 2812b, 2812c and one of UEs 2891, 2892 of FIG. 28, respectively. This is to say, the inner workings of these entities may be as shown in FIG. 29 and independently, the surrounding network topology may be that of FIG. 28.

In FIG. 29, OTT connection 2950 has been drawn abstractly to illustrate the communication between host computer 2910 and UE 2930 via base station 2920, without explicit reference to any intermediary devices and the precise routing of messages via these devices. Network infrastructure may determine the routing, which it may be configured to hide from UE 2930 or from the service provider operating host computer 2910, or both. While OTT connection 2950 is active, the network infrastructure may further take decisions by which it dynamically changes the routing (e.g., on the basis of load balancing consideration or reconfiguration of the network).

Wireless connection 2970 between UE 2930 and base station 2920 is in accordance with the teachings of the embodiments described throughout this disclosure. One or more of the various embodiments may improve the performance of OTT services provided to UE 2930 using OTT connection 2950, in which wireless connection 2970 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 2950 between host computer 2910 and UE 2930, in response to variations in the measurement results. The measurement procedure and/or the network functionality for reconfiguring OTT connection 2950 may be implemented in software 2911 and hardware 2915 of host computer 2910 or in software 2931 and hardware 2935 of UE 2930, or both. In embodiments, sensors (not shown) may be deployed in or in association with communication devices through which OTT connection 2950 passes; the sensors may participate in the measurement procedure by supplying values of the monitored quantities exemplified above, or supplying values of other physical quantities from which software 2911, 2931 may compute or estimate the monitored quantities. The reconfiguring of OTT connection 2950 may include message format, retransmission settings, preferred routing etc.; the reconfiguring need not affect base station 2920, and it may be unknown or imperceptible to base station 2920. Such procedures and functionalities may be known and practiced in the art. In certain embodiments, measurements may involve proprietary UE signaling facilitating host computer 2910's measurements of throughput, propagation times, latency and the like. The measurements may be implemented in that software 2911 and 2931 causes messages to be transmitted, in particular empty or 'dummy' messages, using OTT connection 2950 while it monitors propagation times, errors etc.

Figure 30:
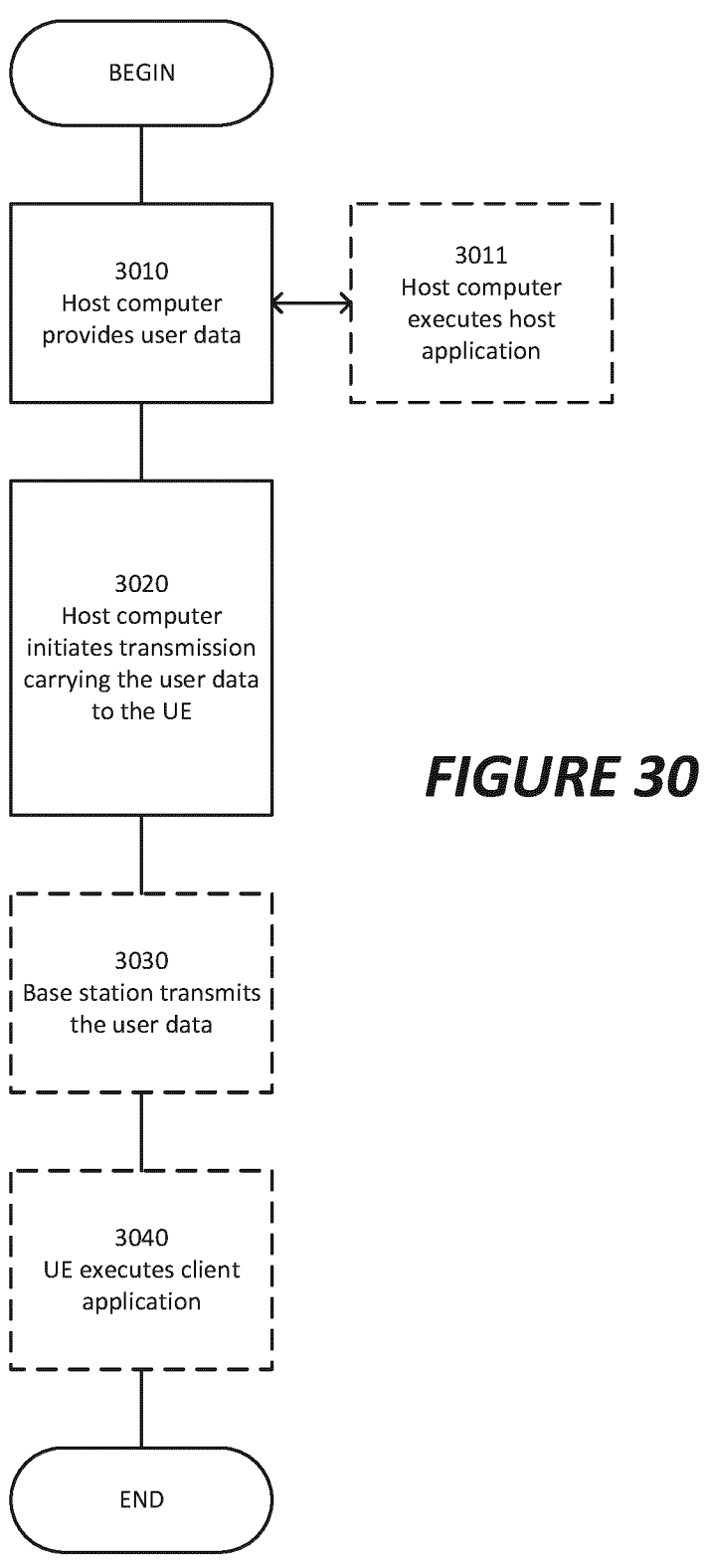
FIG. 30 is a block diagram of methods implemented in a communication system including a host computer, a base station, and a user equipment in accordance with some embodiments.

FIG. 30: Methods implemented in a communication system including a host computer, a base station and a user equipment in accordance with some embodiments.

FIG. 30 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 30 will be included in this section. In step 3010, the host computer provides user data. In substep 3011 (which may be optional) of step 3010, the host computer provides the user data by executing a host application. In step 3020, the host computer initiates a transmission carrying the user data to the UE. In step 3030 (which may be optional), the base station transmits to the UE the user data which was carried in the transmission that the host computer initiated, in accordance with the teachings of the embodiments described throughout this disclosure. In step 3040 (which may also be optional), the UE executes a client application associated with the host application executed by the host computer.

Figure 31:
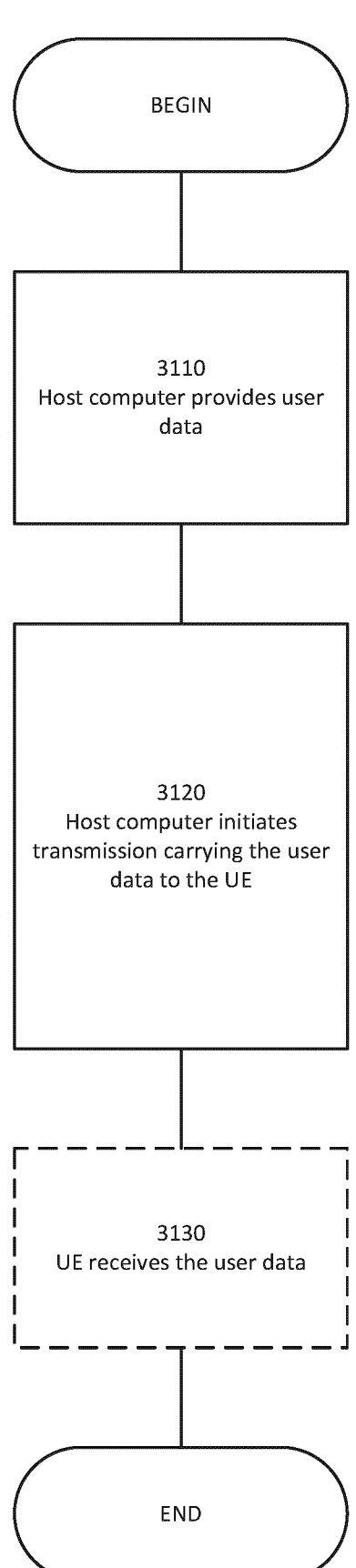
FIG. 31 is a block diagram of methods implemented in a communication system including a host computer, a base station, and a user equipment in accordance with some embodiments.

FIG. 31: Methods implemented in a communication system including a host computer, a base station and a user equipment in accordance with some embodiments.

FIG. 31 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 31 will be included in this section. In step 3110 of the method, the host computer provides user data. In an optional substep (not shown) the host computer provides the user data by executing a host application. In step 3120, the host computer initiates a transmission carrying the user data to the UE. The transmission may pass via the base station, in accordance with the teachings of the embodiments described throughout this disclosure. In step 3130 (which may be optional), the UE receives the user data carried in the transmission.

Figure 32:
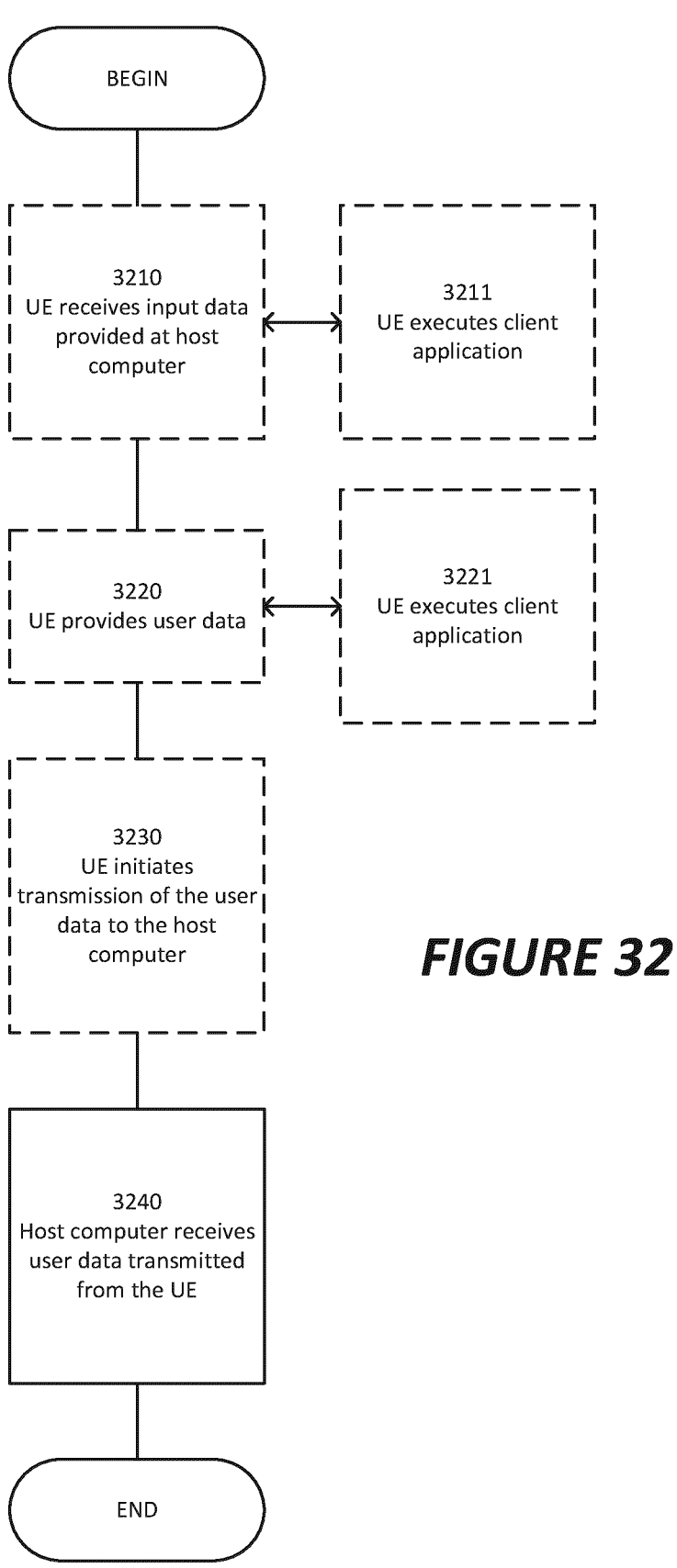
FIG. 32 is a block diagram of methods implemented in a communication system including a host computer, a base station, and a user equipment in accordance with some embodiments.

FIG. 32: Methods implemented in a communication system including a host computer, a base station and a user equipment in accordance with some embodiments.

FIG. 32 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 32 will be included in this section. In step 3210 (which may be optional), the UE receives input data provided by the host computer. Additionally or alternatively, in step 3220, the UE provides user data. In substep 3221 (which may be optional) of step 3220, the UE provides the user data by executing a client application. In substep 3211 (which may be optional) of step 3210, the UE executes a client application which provides the user data in reaction to the received input data provided by the host computer. In providing the user data, the executed client application may further consider user input received from the user. Regardless of the specific manner in which the user data was provided, the UE initiates, in substep 3230 (which may be optional), transmission of the user data to the host computer. In step 3240 of the method, the host computer receives the user data transmitted from the UE, in accordance with the teachings of the embodiments described throughout this disclosure.

Figure 33:
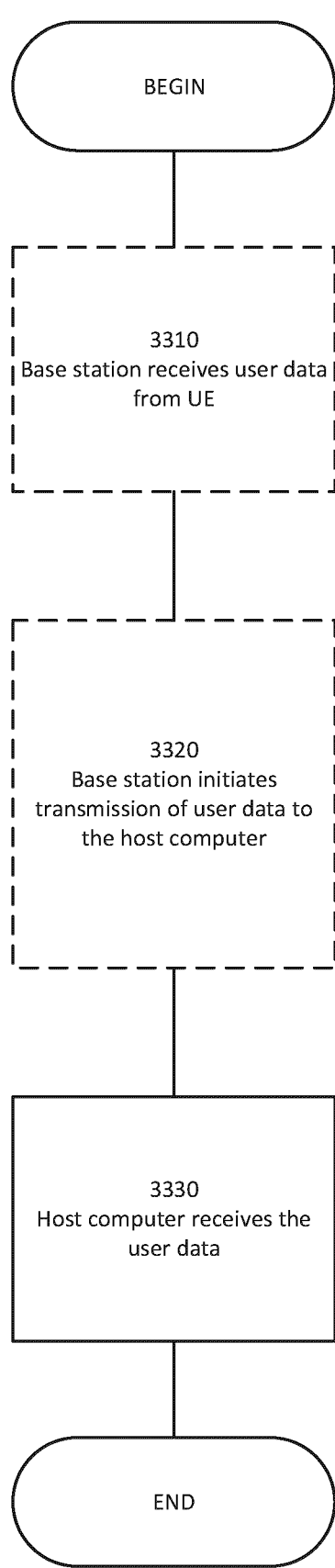
FIG. 33 is a block diagram of methods implemented in a communication system including a host computer, a base station, and a user equipment in accordance with some embodiments.

FIG. 33: Methods implemented in a communication system including a host computer, a base station and a user equipment in accordance with some embodiments.

FIG. 33 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 33 will be included in this section. In step 3310 (which may be optional), in accordance with the teachings of the embodiments described throughout this disclosure, the base station receives user data from the UE. In step 3320 (which may be optional), the base station initiates transmission of the received user data to the host computer. In step 3330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a network node in a communication system, comprising more than one search space group, wherein a search space group comprises a plurality of configured search space sets, the method comprising:

generating a scheduling downlink control information (DCI) message wherein the DCI message is scrambled using an identifier that is UE specific, wherein the DCI message is scrambled using an identifier that is associated with a plurality of UEs that are configured to monitor a first search space group and to switch to monitoring a second search space group in response to successfully decoding the DCI message, and wherein the DCI message comprises an indication of one or more UEs of the plurality of UEs to which the DCI message applies, wherein the indication comprises a time/frequency location at which the DCI message is located in a search space; and transmitting the DCI message on a downlink control channel;

wherein the DCI message is configured to cause a user equipment (UE) to switch from monitoring the first search space group to monitoring the second search space group in response to successfully decoding the DCI message.

2. The method of claim 1, wherein the DCI message comprises a first DCI message transmitted on the downlink control channel at a first time/frequency location, the method further comprising:

generating a second DCI message; and transmitting the second DCI message on the downlink control channel at a second time/frequency location;

wherein the first and second DCI messages are scrambled using an identifier that is associated with a plurality of UEs that are configured to monitor the first search space group and to switch to monitoring the second search space group in response to successfully decoding the first or second DCI message.

3. The method of claim 2, wherein the first DCI message and/or the second DCI message are transmitted within a search space that is not included in the first search space group.

4. The method of claim 1, further comprising:

configuring the UE with more than two search space groups;

wherein the DCI message includes an indication of which of the more than two search space groups the UE is to start monitoring in response to receiving the DCI message.

5. The method of claim 1, wherein the DCI message contains an explicit indication to the UE to switch search space group monitoring to a different search space group.

6. The method of claim 1, further comprising:

configuring the UE for implicit search space group switching;

wherein the DCI message comprises an explicit indication to the UE to switch search space groups; and wherein the UE is configured to switch search space groups in response to the explicit indication.

7. The method of claim 6, wherein a scrambling code used to scramble the DCI message is associated with a specific search space group.

8. The method of claim 1, further comprising:

receiving an uplink transmission from the UE; and transmitting a further DCI message to the UE on a second search space group to which the UE switched implicitly after transmitting the uplink transmission.

9. A network node comprising:

a processing circuit; and a memory circuit coupled to the processing circuit, wherein the memory circuit comprises computer readable program instructions that, when executed by the processing circuit, cause the network node to perform operations according to claim 1.

10. A method performed by a user equipment (UE) in a communication system, wherein the UE is configured to monitor a first search space group wherein a search space group comprises a plurality of configured search space sets, the method comprising:

receiving a scheduling downlink control information (DCI) message on a downlink control channel, wherein the DCI message indicates to switch monitoring search space group and is scrambled using an identifier that is UE specific, wherein the DCI message is scrambled using an identifier that is associated with a plurality of UEs that are configured to monitor the first search space group and to switch to monitoring a second search space group in response to successfully decoding the DCI message, and wherein the DCI message comprises an indication of one or more UEs of the plurality of UEs to which the DCI message applies, wherein the indication comprises a time/frequency location at which the DCI message is located in a search space; and switching from monitoring the first search space group to monitoring the second search space group in response to successfully decoding the DCI message.

11. The method of claim 10 wherein the DCI message is a scheduling DCI message that does not contain scheduling information.

12. The method of claim 10, wherein the DCI message comprises a first DCI message that is received on the downlink control channel at a first time/frequency location, the method further comprising:

receiving a second DCI message on the downlink control channel at a second time/frequency location, wherein the first and second DCI messages are scrambled using an identifier that is associated with a plurality of UEs that are configured to monitor the first search space group; and switching to monitoring a second search space group in response to successfully decoding the first or second DCI message.

13. The method of claim 12, wherein the DCI message identifies a cell in the first search space group that is to be switched to the second search space group, and wherein other cells in the first search space group are not switched to the second search space group.

14. A method performed by a user equipment (UE) in a communication system, wherein the UE is configured to monitor a first search space group wherein a search space group comprises a plurality of configured search space sets, the method comprising:

receiving a scheduling downlink control information (DCI) message on a downlink control channel, wherein the DCI message indicates to switch monitoring search space group and is scrambled using an identifier that is UE specific; and switching from monitoring the first search space group to monitoring a second search space group in response to successfully decoding the DCI message, wherein a timer configuration is provided for each search space group of a plurality of search space groups except the first search space group, wherein the timer configuration includes at least a timer value and a search space group to transition to upon timer expiry.

15. The method of claim 10, wherein the UE is configured with more than two search space groups;

wherein the DCI message includes an indication of which of the more than two search space groups the UE is to start monitoring in response to receiving the DCI message.

16. The method of claim 15, wherein the UE is configured to start monitoring a first one of the more than two search space groups in response to the DCI message and to stop monitoring the first one of the more than two search space groups and start monitoring a second one of the more than two search space groups upon receipt of a further DCI message or expiration of a timer while monitoring the first one of the more than two search space groups.

17. The method of claim 10, wherein the DCI message comprises an explicit indication to the UE to switch search space group monitoring;

wherein switching from monitoring the first search space group to monitoring the second search space group is performed in response to the explicit indication in the DCI message.

18. The method of claim 17, wherein the DCI message includes a dedicated bit field that carries the explicit indication, wherein the dedicated bit field comprises a value that is mapped to a particular search space group of a plurality of search space groups.

19. The method of claim 18, wherein the UE is configured to switch search space groups in response to the explicit indication following a predetermined delay.

20. The method of claim 10, wherein the UE is configured for implicit search space group switching; and wherein the DCI message includes an explicit indication to the UE to switch monitoring of search space groups; the method further comprising switching monitoring of search space groups in response to the explicit indication, wherein one of:

a DCI format of the DCI message is associated with a specific search space group; and wherein the UE is configured to start monitoring the specific search space group associated with a DCI format of DCI message; and a scrambling code used to scramble the DCI message is associated with a specific search space group, wherein the UE is configured to start monitoring the specific search space group associated with the scrambling code used to scramble the DCI message.

21. The method of claim 10, further comprising:

transmitting an uplink transmission while monitoring the first search space group; and switching implicitly after transmitting the uplink transmission to monitoring the second search space group.

22. A user equipment (UE) comprising:

a processing circuit; and a memory circuit coupled to the processing circuit, wherein the memory circuit comprises computer readable program instructions that, when executed by the processing circuit, cause the UE to perform operations according to claim 10.

* * * * *